United States Patent [19]

McWilliams et al.

[11] Patent Number: 5,213,281
[45] Date of Patent: May 25, 1993

[54] METHOD AND APPARATUS FOR TRACKING AN AIMPOINT WITH ARBITRARY SUBIMAGES

[75] Inventors: Joel K. McWilliams, Highland Village; Don R. Van Rheeden, Lewisville, both of Tex.

[73] Assignee: Texas Instruments Incorporated, Dallas, Tex.

[21] Appl. No.: 753,151

[22] Filed: Aug. 30, 1991

[51] Int. Cl.$^5$ ............................................. F41G 7/30
[52] U.S. Cl. ................................................ 244/3.15
[58] Field of Search ..................... 244/3.15, 3.16, 3.17

[56] References Cited

U.S. PATENT DOCUMENTS

| | | | |
|---|---|---|---|
| 3,912,198 | 10/1975 | Dell et al. | 244/3.16 |
| 4,133,004 | 1/1979 | Fitts | 244/3.16 |
| 4,476,494 | 10/1984 | Tugaye | 244/3.17 |
| 4,868,871 | 9/1991 | Watson et al. | 382/1 |

OTHER PUBLICATIONS

Blackman, Multiple-Target Tracking with Radar Applications, Artech House, Inc., pp. 309-328, 1986.
Huber, Robust Statistics, John Wiley & Sons, Inc. pp. 107-108, 1981.
Liu, "New Image Tracking Algorithm for Fuzzy-Relaxation Matching of Point Patterns", Honguai Yanjui, vol. 8, No. 5, 1989, pp. 349-354.
Mao, "Image Sequence Processing for Target Estimation in Forward-Looking Infrared Imagery" Optical Engineering, vol. 27, No. 7, pp. 541-549, Jul. 1988.
Hayman, "Design and Simulation of an Intelligent Missile Seeker," (origin date of Article unknown).
Texas Instruments Inc., Defense Systems and Electronics Group "Software Functional Specification for Image Tracking of the Autonomous Guidence for Conventional Weapons Technical Expert", 3183-S-0008, Aug. 15, 1989, vol 6 of 15, Rev. B. Aug. 24, 1990 (prepared for the Dept. of the Air Force).
A Collection of Presentation Materials Prepared by the Applicants on Jun. 26, 1991, for Presentation to the U.S. Army Technical Staff.
A Computer Printout of the Results of a Patent Search, Conducted Aug. 20, 1991, By TI Library Personnel.

Primary Examiner—Charles T. Jordan
Attorney, Agent, or Firm—René E. Grossman; Richard L. Donaldson

[57] ABSTRACT

A method is disclosed for tracking an aimpoint with a set of arbitrarily related subimages. A dimensional relationship between the subimages and the aimpoint is initially determined and saved for later calculations. Subsequently, at least one of the subimages is reacquired. The aimpoint at the subsequent time is then determined using the later acquired subimages and the saved dimensional relationship.

20 Claims, 3 Drawing Sheets

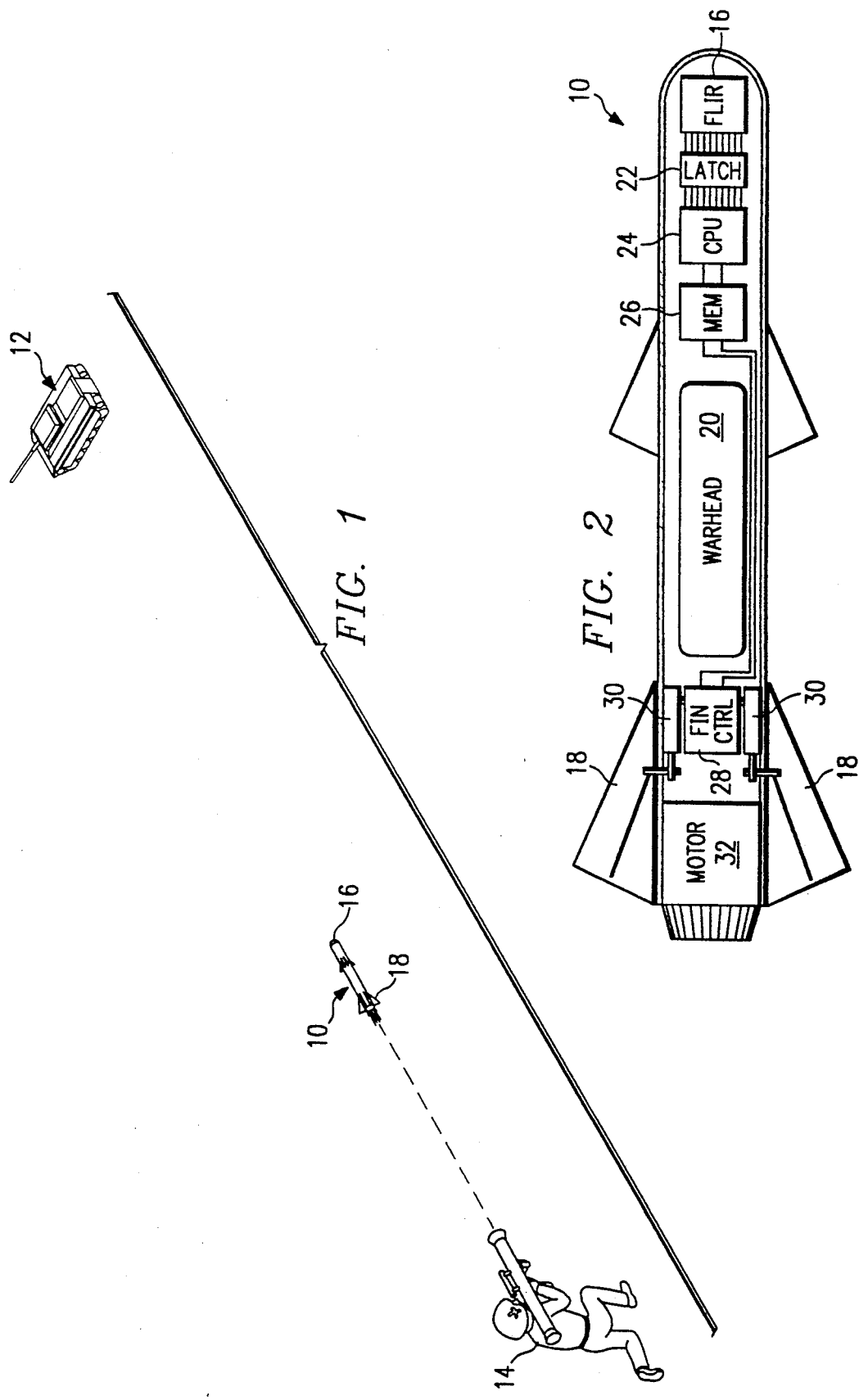

METHOD AND APPARATUS FOR TRACKING AN AIMPOINT WITH ARBITRARY SUBIMAGES

RELATED APPLICATIONS

This Application is related to U.S. patent application Ser. No. 07/752,740, filed Aug. 30, 1991, entitled "Method and Apparatus for Tracking an Aimpoint on an Elongate Structure", and is incorporated by reference herein.

This Application is related to U.S. patent application Ser. No. 07/753,294, filed on Aug. 30, 1991, entitled "Method and Apparatus for Rejecting Trackable Subimages", and is incorporated by reference herein.

TECHNICAL FIELD OF THE INVENTION

This invention relates to imaging and guidance systems and more particularly to tracking an aimpoint with variable subimages.

BACKGROUND OF THE INVENTION

In certain computer control applications, it is necessary to track and measure an image of an object passively. It is especially important in weapons delivery systems that a target be so tracked. If such a target were tracked actively, (i.e., using radar or laser range finding techniques) the target might detect the presence of the tracker or tracking system. Once the target has detected the presence of the tracker, it can respond in one of several ways, all of which are deleterious to the tracker. For instance, the target might "jam" the tracker by bombarding it with signals that are comparable to those which the tracker is actively using. The target might also fire its own weapon at the tracker, at the source of the tracking signal, or, even at the launching site of the tracker. In this way, the target could defeat the tracker, destroy the tracker or perhaps even destroy the launch site of the tracker, including the operating personnel.

Passively tracking a target, however, imposes at least one serious limitation on the tracker. A tracker cannot accurately determine the distance or "range" to a target if it cannot actively sense the object. An active tracker, for instance, could determine the distance to a target by measuring the elapsed time from the emission of a radio frequency signal to the receipt of the signal reflected off of the target. The absence of a range measurement from tracker to target limits the passive tracker's ability to compensate for the apparent change in target image as the tracker moves in relationship to the target. Without this ability, a tracker will fail to maintain a constant target.

In practice, a tracker benefits by tracking several subimages of its target's image. These subimages are two dimensional representations of structures that are physically connected to the exact target location or "aimpoint" in the real three-dimensional world. Multiple subimages are used for redundancy purposes and because the actual aimpoint of the target is often untrackable. As the tracker nears the target, however, the subimages will appear to move with respect to each other. The position of the subimages with respect to one another may also change in certain situations. For instance, two subimages located on a target may appear to approach one another if they are located on a face of a target that is rotating away from the tracker. A tracker targeting an elongate structure such as a runway or tall building will sense complex subimage motion due to closure of the tracker on the target. These subimages will appear to move at rates that are dependent on their location within the tracker's field of view.

Prior attempts to passively track an object have resulted in solutions with limited flexibility and poor accuracy. Heretofore, an object once identified as an aimpoint was tracked by tracking a predetermined number of subimages in a known pattern. Typically, the pattern chosen was a square with the aimpoint at its center and four subimages located at the four corners of the square. That system would track the four subimages located at the corners of the square and infer he actual aimpoint using the simple symmetry of the predetermined square. This method faltered when the geometry of the actual target resulted in less than four suitable subimages located in the requisite pattern. This system also lacked the ability to use trackable subimages that were not in the requisite pattern.

Therefore, a need has arisen for a passive subimage tracker which is able to track any number of subimages arbitrarily related to an aimpoint without range data.

SUMMARY OF THE INVENTION

In accordance with the present invention, a method for tracking an aimpoint is provided which substantially eliminates or reduces disadvantages and problems associated with prior trackers.

A method for tracking an aimpoint comprises the steps of acquiring an aimpoint on a target and a set of subimages arbitrarily associated with the aimpoint in a field of view. The normalized distance from each subimage to the aimpoint is calculated for use at a later time when at least one of the subimages is reacquired. The subsequent location of the aimpoint is estimated based on the subsequent location of the subimages and on the normalized distances.

It is a first technical advantage of the invention that an aimpoint may be tracked without range data using subimages that are arbitrarily related to the aimpoint. A normalized distance from the aimpoint to each subimage is calculated at an initial time and saved for subsequent steps. At each subsequent time, a target image magnification factor is calculated which maintains the same normalized distance from each subimage to the aimpoint. The subsequent location of the aimpoint may be maintained despite apparent movement of the subimages.

A second technical advantage of the invention is its flexibility. The target image magnification factor may be slightly adjusted to model different scenarios as the users needs merit. For instance, the target image magnification factor may be a single parameter, a pair of parameters that directly represent the magnification of the image, or a pair of parameters related to the magnification of the image. The first case will provide results using a model which assumes uniform target magnification. The second and third cases may be used to accurately target an image rotating about one of several axis.

BRIEF DESCRIPTION OF THE DRAWINGS

For a more complete understanding of the present invention, and the advantages thereof, reference is now made to the following descriptions taken in conjunction with the accompanying drawings, in which:

FIG. 1 is a perspective schematic view of an antiarmor "fire and forget" missile system which may advantageously incorporate the disclosed invention;

FIG. 2 is a part schematic part cross-sectional diagram of the anti-armor missile of FIG. 1;

DETAILED DESCRIPTION OF THE INVENTION

Figure 3:
FIG. 3 is a half-tone replication of a digitized image of the target at a certain time as seen by the "fire and forget" missile depicted in FIG. 1.

The preferred embodiment of the present invention and its advantages are best understood by referring to FIGS. 1-9, of the drawings, like numerals being used for like and corresponding parts of the various drawings.

FIG. 1 depicts an anti-armor "fire and forget" missile system which incorporates the disclosed invention. A missile 10 is fired at a target 12 by an infantryman 14. Infantryman 14 selects an aimpoint on the target 12 that he believes will offer the least resistance to missile 10 upon impact. Missile 10 incorporates a passive imaging sensor 16 and a processor (not shown) for acquiring and digitizing an image. Missile 10 also has movable fins 18 which are controlled by the processor to vary the direction of the missile. Missile 10 acquires trackable subimages related to the particular aimpoint selected by infantryman 14 which are within the field of view of the sensor 16. Missile 10 computes an initial geometric relationship between the aimpoint and the initial subimages and retains this in an onboard memory (not shown). Missile 10 periodically reacquires the subimages and computes a new aimpoint as will be more fully described below. Missile 10 may then adjust its path to intercept target 12 despite subsequent movement of the target 12 relative to infantryman 14 or missile 10.

The type of missile depicted in FIG. 1 is known as a "fire and forget" missile because infantryman 14 may forget the missile after launch and seek cover or engage other targets of opportunity. Missile 10, however, will continue to track and intercept target 12. Missile 10 may select subimages based on any number of criteria including, but not limited to, the "hot spot" and "correlator" methods. In these methods, a sensor identifies subimages according to the hottest (brightest or warmest) spot within a specified region and by finding a previously identified geometric pattern, respectively.

FIG. 2 depicts "fire and forget" missile 10 which may incorporate the disclosed invention. Missile 10 delivers a warhead 20 which detonates upon impact with target 12 (FIG. 1). The missile 10 contains an onboard sensor 16 such as a forward looking infrared camera ("FLIR"), that is sensitive to radiation emitted by the missile's target. A latch 22 temporarily saves the information received by sensor 16 so that it is more accessible by a central processing unit ("CPU") 24. CPU 24 periodically acquires images within its field of view during the operation of missile 10. CPU 24 has associated with it a memory 26. Memory 26 contains the routines which CPU 24 runs and stores data necessary to the disclosed invention. CPU 24 controls the direction of missile 10 through a fin control unit 28. Fin control unit 28 manipulates each fin 18 through, for example, a servo 30. Missile 10 is propelled by a rocket motor 32.

FIG. 3 depicts a view of target 12 by missile 10. The aimpoint, as originally specified by infantryman 14 is indicated by a crosshairs. In this particular embodiment, missile 10 has an infrared sensor. The engine compartment and wheel bearings of target 12, being hottest, are therefore indicated by the color white. Cooler structures such as the background are indicated by shades of grey and by black.

Figure 4:
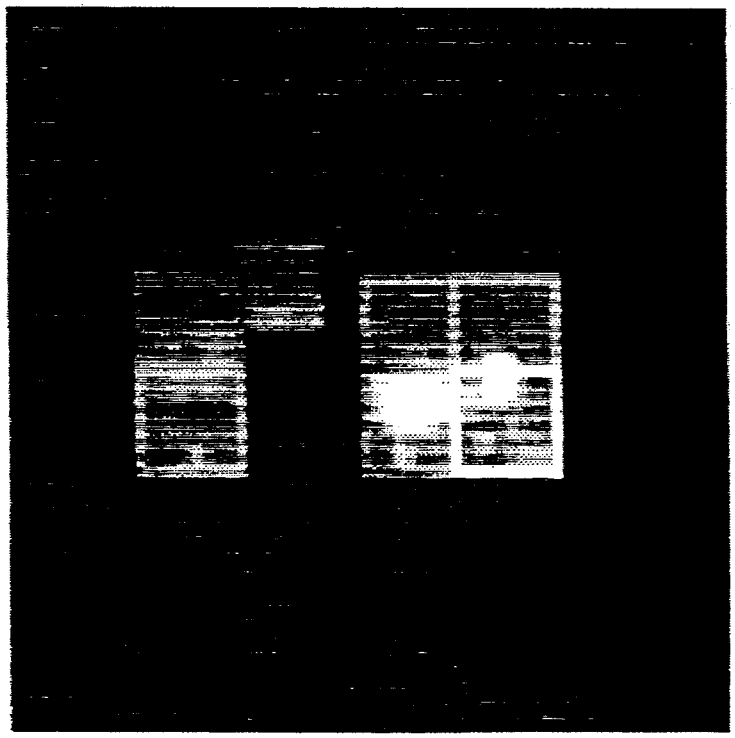
FIG. 4 depicts trackable subimages associated with the target depicted in FIG. 1 at the time corresponding to the time of FIG. 3.

FIG. 4 depicts certain trackable subimages contained in FIG. 3. Each trackable subimage is identified as a small square. All other areas are blocked from view. A tracker on board missile 10 initially selects a number of these subimages to track the target at an initial time. The tracker also calculates a normalized distance between the aimpoint selected by the infantryman 14 and each subimage. This distance may be the actual number of pixels between the aimpoint and the subimage as sensed by the tracker. The distance may be further normalized so that at least one subimage is a certain distance, such as "1" away from the aimpoint. These dimensions are saved for future use by the tracker.

Figure 5:
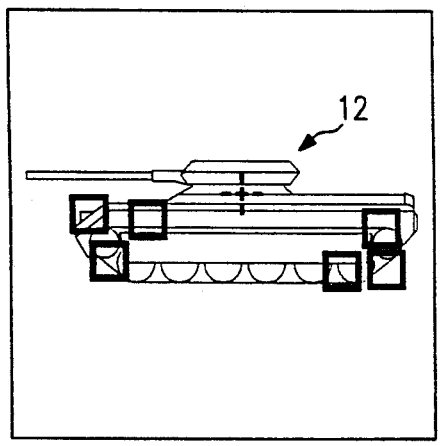
FIGS. 5 and 6 depict the image and trackable subimages of the target from FIG. 1 at a first time and at a subsequent time, respectively.
Figure 6:
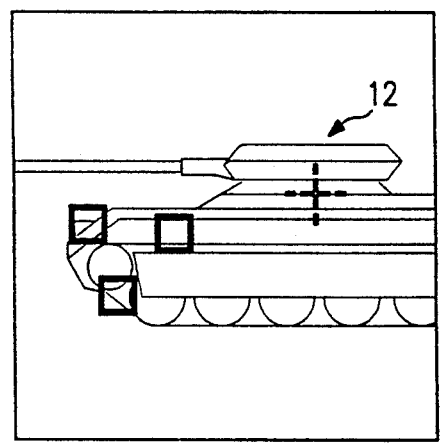

FIG. 5 depicts a view of target 12 and six trackable subimages superimposed thereon. FIG. 6 depicts the view of target 12 and the trackable subimages as depicted in FIG. 5 at a slightly later time. The image of target 12 appears to grow in size as the missile 10 (FIGS. 1 and 2) closes in on target 12. As a consequence, the subimages depicted also appear to grow in size and to move radially outward from the aimpoint. Three subimages, initially at the right side of FIG. 5, are no longer visible in the field of view. The tracker will typically adjust its course to maintain the aimpoint (crosshairs) in the center of its field of view. This apparent movement of the subimages relative to the aimpoint and the loss of some subimages must be accounted for by the tracker to insure successful guidance of missile 10 to target 12.

The approach to multiple subimage tracking without range estimates is based on a generalized geometric model. This model is based on the fact that though the target and thus the subimages will be growing in the image during closure to the target, the relative dimensions of the target do not change. This assumes that the angle of attack between the tracker and target stays fairly constant, which is common during most of the terminal phase of the missile flight.

In the generalized geometric approach each tracker location is related to the aimpoint location using a normalized coordinate frame. An individual subimage i at image location $(x_i, y_i)$ can be related to the aimpoint A at image location $(x_A, y_A)$ by the following equations:

$$x_i = x_A + \delta x_i + n_{xi}$$

$$y_i = y_A + \delta y_i + n_{yi}$$

where $(\delta x_i, \delta y_i)$ represents the offset in the image plane of subimage i from the aimpoint A, and $(n_{xi}, n_{yi})$ are additive noise terms which corrupt measurement of the true subimage location. These equations can be combined into a single equation using vector notation:

$$\underline{x} = \underline{x}_A + \underline{\delta x} + \underline{n}$$

The key to accurately modeling each subimage position is the accurate representation of the offset vector. This vector may be modeled several ways depending upon the accuracy desired or the expected behavior of the target.

Single Magnification Model

This model assumes that the subimages will move radially outward from the aimpoint (in an intercept mode) at a rate which is identical for the vertical and for the horizontal dimensions of the image.

The offset vector may then be expressed as $$\begin{bmatrix} \delta x_i \\ \delta y_i \end{bmatrix} = \begin{bmatrix} s d_{xi} \\ s d_{yi} \end{bmatrix}$$

where s is the target image magnification factor ("TIMF") and ($d_{xi}$, $d_{yi}$) are the size normalized distances between a subimage i and the aimpoint A. Thus ($d_{xi}$, $d_{yi}$) are range independent normalized distances. Although size is typically chosen as the normalization factor because it is a measurable quantity of the target, any scaling factor can be used. This model leads to the following matrix representation for a subimage i:

$$\begin{bmatrix} x_i \\ y_i \end{bmatrix} = \begin{bmatrix} 1 & 0 & d_{xi} \\ 0 & 1 & d_{yi} \end{bmatrix} \begin{bmatrix} x_A \\ y_A \\ s \end{bmatrix} + \begin{bmatrix} n_{xi} \\ n_{yi} \end{bmatrix}$$

For N subimages, the previous equation may be expanded:

$$\begin{bmatrix} x_i \\ \cdot \\ \cdot \\ \cdot \\ x_N \\ y_1 \\ \cdot \\ \cdot \\ \cdot \\ y_N \end{bmatrix} = \begin{bmatrix} 1 & 0 & d_{xi} \\ \cdot & \cdot & \cdot \\ \cdot & \cdot & \cdot \\ \cdot & \cdot & \cdot \\ 1 & 0 & d_{xN} \\ 0 & 1 & d_{y1} \\ \cdot & \cdot & \cdot \\ \cdot & \cdot & \cdot \\ \cdot & \cdot & \cdot \\ 0 & 1 & d_{yN} \end{bmatrix} \begin{bmatrix} x_A \\ y_A \\ s \end{bmatrix} + \begin{bmatrix} n_{x1} \\ \cdot \\ \cdot \\ \cdot \\ n_{xN} \\ n_{y1} \\ \cdot \\ \cdot \\ \cdot \\ n_{yN} \end{bmatrix}$$

This equation may be rewritten as $$\underline{x} = H\theta + \underline{n}$$
where
$$\theta = [x_A \; y_A \; s]^T$$

and H is the $2N \times 3$ matrix of "1"s, "0"s, and normalized distances depicted above. At each successive time the tracker reacquires the subimages, all variables are known except those in $\theta$ and in the noise vector $\underline{n}$.

The vector $\theta$ and hence the aimpoint may be estimated by several techniques including a least squares technique where:

$$\hat{\theta} = (H^T H)^{-1} H^T \underline{x}$$

where $\hat{\theta}$ is an estimation of $\theta$. This method will minimize the effect of the noise vector $\underline{n}$.

This model is suitable for applications where the target is generally in a plane perpendicular to a plane containing the weapon's trajectory, and when the viewing aspect of the target by the missile does not change significantly during closure. In such cases, the apparent motion of the subimages is caused primarily by the closure of the tracker and not by the rotation of the target with respect to the tracker.

Dual Magnification Model

Figure 7A:
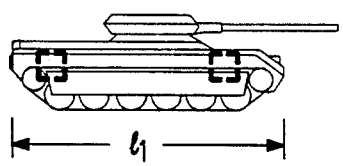
FIGS. 7a–c illustrate perspectively the apparent decrease in width of a turning target.
Figure 7B:
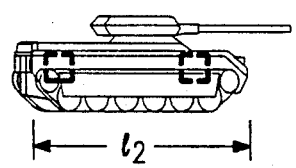
Figure 7C:
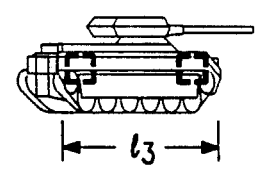

FIGS. 7a–c depict a physical complication to the Single Magnification Model. Here, a target is rotating about an axis generally parallel to the focal plane of the sensor onboard the tracker. Although the apparent height of the target is constant through the rotation of the target, the apparent length of the target, $l_1$, $l_2$, and $l_3$, decreases as the target turns. Two exemplary subimages (indicated by dashed boxes) located generally on each end of the target appear to move together. Conversely, if the target were to turn towards the tracker, its apparent length would increase and the two subimages would move apart. There would be no apparent movement, however, between two subimages located immediately above and below each other. Mathematically, therefore, the magnification differs for the two dimensions of the target. The offset vector $\underline{\delta x}$ may be expressed as:

$$\begin{bmatrix} \delta x_i \\ \delta y_i \end{bmatrix} = \begin{bmatrix} s_x d_{xi} \\ s_y d_{yi} \end{bmatrix}$$

where ($s_x$, $s_y$) are the TIMF's and ($d_{xi}$, $d_{yi}$) are the size normalized distances between subimage i and the aimpoint A. By using two magnification factors in the TIMF, the tracker can mathematically compensate for rotation of its target as depicted in FIGS. 7a–c. Again ($d_{xi}$, $d_{yi}$) are range independent normalized distances as described in connection with the Single Magnification Model. These are typically normalized to the size of the target. This offset vector leads to the expression:

$$\begin{bmatrix} x_i \\ y_i \end{bmatrix} = \begin{bmatrix} 1 & d_{xi} & 0 & 0 \\ 0 & 0 & 1 & d_{yi} \end{bmatrix} \begin{bmatrix} x_A \\ s_x \\ y_A \\ s_y \end{bmatrix} + \begin{bmatrix} n_{xi} \\ n_{yi} \end{bmatrix}$$

for a single subimage i, and $$\begin{bmatrix} x_i \\ \cdot \\ \cdot \\ \cdot \\ x_N \\ y_1 \\ \cdot \\ \cdot \\ \cdot \\ y_N \end{bmatrix} = \begin{bmatrix} 1 & d_{x1} & 0 & 0 \\ \cdot & \cdot & & \\ \cdot & \cdot & & \\ \cdot & \cdot & & \\ 1 & d_{xN} & 0 & 0 \\ 0 & 0 & 1 & d_{y1} \\ \cdot & & \cdot & \cdot \\ \cdot & & \cdot & \cdot \\ \cdot & & \cdot & \cdot \\ 0 & 0 & 1 & d_{yN} \end{bmatrix} \begin{bmatrix} x_A \\ s_x \\ y_A \\ s_y \end{bmatrix} + \begin{bmatrix} n_{x1} \\ \cdot \\ \cdot \\ \cdot \\ n_{xN} \\ n_{y1} \\ \cdot \\ \cdot \\ \cdot \\ n_{yN} \end{bmatrix}$$

for N subimages.

The previous expression may be more conveniently written as $$\underline{x} = G\theta' + \underline{n}$$

where $$\theta' = [x_A S_x y_A S_y]^T$$

and G is a 2N×4 matrix of "1"s, "0"s, and normalized distances as depicted above. At each successive time the tracker reacquires the subimage, all variables are known except those in $\theta'$ and in the noise vector $\underline{n}$.

The vector $\theta'$ and hence the aimpoint may be estimated by several techniques including a least squares technique where $$\hat{\theta}' = (G^T G)^{-1} G^T \underline{x}$$

where $\hat{\theta}'$ is an estimate of $\theta'$. This method will minimize the effect of the noise vector $\underline{n}$.

Generalized Magnification Model

Figure 8:
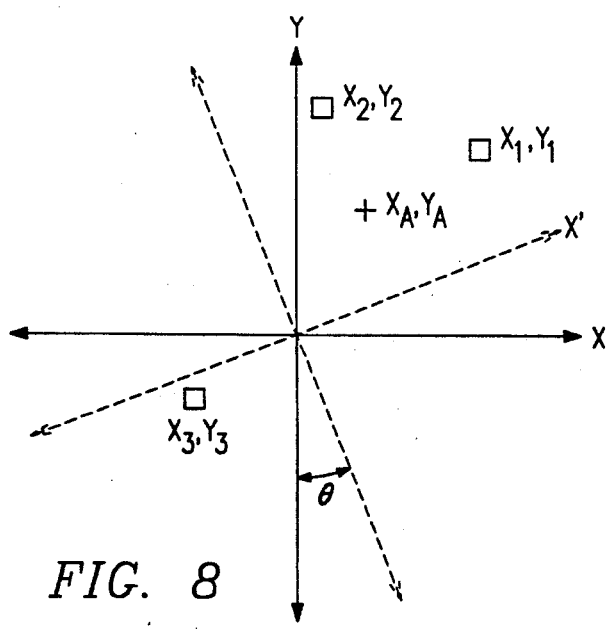
FIG. 8 illustrates a coordinate transformation of subimages used in a third preferred embodiment of the disclosed invention.

FIG. 8 depicts a rotation of the tracker's target image through an angle $\theta$. Such a rotation occurs in the real world when, for instance, a target pitches as it passes over the crest of a hill.

If the change in target axes is not accounted for in such a situation, the aimpoint may be mistakenly discarded as inaccurate or may in fact be inaccurate and used by the tracker. The aimpoint may be considered inaccurate if the tracker implements an error checking routine that considers the variance of the actual location of subimages and an estimated location of each subimage. Such a variance calculation could yield a result that was too great. The tracker would then typically indicate to its related guidance system to "coast" along a course towards the last known aimpoint. The aimpoint used may be inaccurate if it rotates off of the target and onto background clutter. For instance, a long target with subimages selected on one end and with the aimpoint on another would cause such a failure if the target rotated. The tracker would select an aimpoint above or below the true aimpoint.

In FIG. 8, an aimpoint A, at $(x_A, y_A)$ is tracked using three subimages at $(x_1, y_1)$, $(x_2, y_2)$, and $(x_3, y_3)$. After the target rotates through an angle $\Theta$ and the weapon approaches the target, each subimage i at $(x'_i, y'_i)$ is related to the aimpoint A by the equation:

$$\begin{pmatrix} x'_i \\ y'_i \end{pmatrix} = M \begin{pmatrix} \cos\Theta & \sin\Theta \\ -\sin\Theta & \cos\Theta \end{pmatrix} \begin{pmatrix} d_{xi} \\ d_{yi} \end{pmatrix} + \begin{pmatrix} x_A \\ y_A \end{pmatrix}$$

where M is a magnification factor for both dimensions of the image and the coordinates $(x_A, y_A)$ are understood to be in the rotated coordinate frame. Weapon closure is allowed but is not necessary. That is, M could be 1 indicating the same range since initialization. Receding targets are also allowed in this model as in the other two models. In such a case, s, $s_x$, $s_y$, or M would be less than 1. The previous equation may be rewritten as:

$$\begin{pmatrix} x'_i \\ y'_i \end{pmatrix} = \begin{pmatrix} \alpha & \beta \\ -\beta & \alpha \end{pmatrix} \begin{pmatrix} d_{xi} \\ d_{yi} \end{pmatrix} + \begin{pmatrix} x_A \\ y_A \end{pmatrix}$$

where:

$\alpha = M \cos\Theta$
$\beta = M \sin\Theta$

In this case, the 2×2 matrix, containing $\alpha$, $\beta$, and $-\beta$ depicted above is the TIMF. For N subimages the following set of equations relates the rotated subimages to the aimpoint:

$$\begin{bmatrix} x_1' \\ \cdot \\ \cdot \\ \cdot \\ x_N' \\ y_1' \\ \cdot \\ \cdot \\ \cdot \\ y_N' \end{bmatrix} = \begin{bmatrix} 1 & 0 & d_{x1} & d_{y1} \\ \cdot & \cdot & \cdot & \cdot \\ \cdot & \cdot & \cdot & \cdot \\ \cdot & \cdot & \cdot & \cdot \\ 1 & 0 & d_{xN} & d_{yN} \\ 0 & 1 & +d_{yi} & -d_{x1} \\ \cdot & \cdot & \cdot & \cdot \\ \cdot & \cdot & \cdot & \cdot \\ \cdot & \cdot & \cdot & \cdot \\ 0 & 1 & d_{yN} & -d_{xN} \end{bmatrix} \begin{bmatrix} x_A \\ y_A \\ \alpha \\ \beta \end{bmatrix} + \begin{bmatrix} n_{x1} \\ \cdot \\ \cdot \\ \cdot \\ n_{xN} \\ n_{y1} \\ \cdot \\ \cdot \\ \cdot \\ n_{yN} \end{bmatrix}$$

The previous expression may be more conveniently written as $$\underline{x} = F\theta'' + \underline{n}$$

where $$\theta'' = [x_A y_A \alpha \beta]^T$$

and F is a 2N×4 matrix of "1"s, "0"s, and normalized distances as depicted above. At each successive time the tracker reacquires the subimages, all variables are known except those in $\theta''$ and in the noise vector.

The vector $\theta''$ and hence the aimpoint may be estimated by several techniques including a least squares technique where $$\hat{\theta}'' = (F^T F)^{-1} F^T \underline{x}$$

where $\hat{\theta}''$ is an estimate of $\theta''$. This method will minimize the effect of the noise vector $\underline{n}$. Once $\theta''$ is estimated, M and $\Theta$ may be determined by the relations:

$$\alpha^2 + \beta^2 = M^2$$

$$\Theta = \tan^{-1}\left[\frac{\beta}{\alpha}\right]$$

Figure 9:
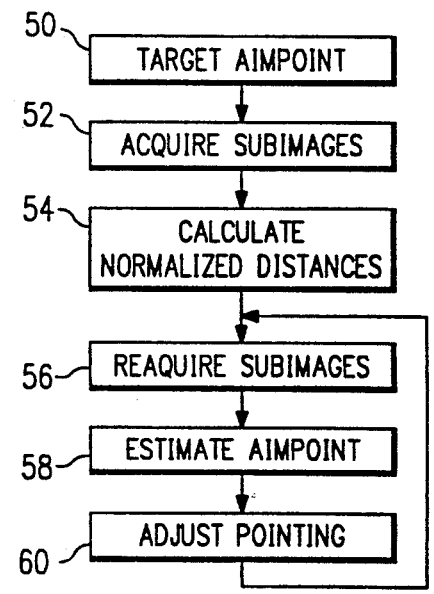
FIG. 9 depicts a flow chart of the disclosed invention.

FIG. 9 depicts a flow chart of a subimage tracker which may incorporate all three embodiments of the disclosed invention. An aimpoint is initially acquired on the target in block 50 by an operator. The tracker then acquires multiple subimages associated with the chosen aimpoint according to internal criteria such as image contrast or image brightness in block 52. The tracker calculates the normalized distances between each subimage that it has acquired and the selected aimpoint in block 54. These distances are stored in a matrix whose particular form depends on which mathematical model is implemented. In blocks 56 and 58, the tracker reacquires the subimages and estimates the location of the aimpoint from the previously calculated normalized distances using one of the particular mathematical models described above. If the tracker is closing on the target, some of the original subimages may leave the field of view of the sensor. Meanwhile, new trackable subimages may be found as target details appear. These new subimage locations may be added to the matrix of subimage locations, typically in block 56, as needed. The tracker may then adjust its trajectory, block 60, to maintain the aimpoint at the center of its field of view.

The final three steps depicted in FIG. 9 are repeated until the tracker impacts its target or otherwise ends its program. It should be understood that block 60 may comprise any number of related steps such as issuing commands to an operator to follow the aimpoint or displaying a crosshairs to pinpoint the location of the aimpoint in a display. The tracker may also be mounted in a stationary environment where it simply follows an aimpoint in its field of view without actively pursuing the target.

Appendix A-G contain FORTRAN computer code disclosing one embodiment of the disclosed invention. In particular, Appendix A discloses subroutine TRKNORNG2D for computing the aimpoint location using the Single Magnification Model. Appendix B discloses Subroutine TRKNORNG for computing the aimpoint location using the Dual Magnification Model. Appendix C discloses Subroutine INTJITTER for rejecting bad subimages associated with an aimpoint estimated by the subroutine TRKNORNG2D. Appendix D discloses subroutine JITTER for rejecting bad subimages associated with an aimpoint estimated by the subroutine TRKNORNG. Appendix E discloses Subroutine LEASTSQ for calculating the least-squares estimate of a parameter vector. Appendix F discloses the common block variable declarations TKPTPARM and PROCPARM for the previous subroutines. Appendix G discloses a library of subroutines useful primarily for matrix math called by subroutines TRKNORNG2D, TRKNORNG, INTJITTER, JITTER and LEASTSQ.

```
C      NOTICE: "COPYRIGHT 1991, (TEXAS INSTRUMENTS, INC.) A portion of
C      the disclosure of this patent document contains material which is subject
C      to copyright protection. The copyright owner has no objection to the
C      facsimile reproduction by anyone of the patent document or the patent
C      disclosure, as it appears in the Patent and Trademark Office patent file
C      or records, but otherwise reserves all copyright rights whatever."
C
C                          Section A
C_____
C                       Texas Instruments
C                    T I   I N T E R N A L   D A T A
C                  Property of Texas Instruments ONLY
C_____
C
C      SUBROUTINE TRKNORNG2D
C_____
C
C      NAME:          TRKNORNG2D
C
C      FUNCTION:      Computes the aimpoint and trackpoint when no range
C                     estimates are available. A least-square estimator
C                     calculates aimpoint and target magnification by
C                     assuming magnification is the same in each dimension.
C                     A single magnification factor is used.
C
C      DESCRIPTION:
C
C           Initialize the trackpoint measurement variances, the number of good
C               trackers, and the standard deviation for one tracker
C           Set the tracker mode to locked on and the breaklock flag to false
C
C           Do for all trackers
C               If a tracker is active and is at least one cycle old Then
C                   Assign model matrices and observation vectors used to
C                      compute least-squares target aimpoint and size estimates
C                   If weight trackers by distance from the aimpoint Then
C                       Assign X distance weights
C                       Assign Y distance weights
C                   Else
C                       Assign all weights to unity
C                   End of If weight trackers by distance from the aimpoint
```

```
C              Increment the number of trackers counter
C          Else this tracker is not active or at least one cycle old
C              Zero the least-squares weights for this tracker
C          End of If a tracker is active and at least 1 cycle old
C      End of Do for all trackers
C
C      If there are at least two valid trackers Then
C          Use least-squares to estimate aimpoint location and target size
C          Run the jitter test to delete trackers with bad measurements
C          Recompute the estimated trackpoint location and target size
C              after removing the bad measurements
C          Compute track errors and measurement variances
C          Update the aimpoint and trackpoint by adding in track errors
C          Save the estimated target sizes
C          Set the tracker mode to locked on
C      Else if there is one valid tracker Then
C          Find the tracker measurement of the good tracker
C          Compute the aimpoint as the offset from the tracker
C          Set the tracker mode to locked on
C      Else there are no valid trackers
C          Set the breaklock flag
C          Set the tracker mode to rate coast
C      End of If there are valid trackers
C
C  REFERENCES:
C
C      None
C
C_____
C
C  CALLING SEQUENCE:
C      CALL TRKNORNG2D
C
C  INPUTS:
C      None
C
C  OUTPUTS:
C      None
C
C  DEPENDENCIES:
C      Common Blocks
C          PROCPARMS      -   Processing parameters
C          TKPTPARMS      -   Trackpoint/aimpoint related parameters
C      Subroutines
C          INTJITTER      -   Integrating jitter test
C          LEASTSQ        -   Weighted least-squares estimator
C
C  SIDE EFFECTS:
C      None
C
C  TARGET PROCESSOR:
C      VAX 8000 series VMS 4.5, Fortran Compiler 4.5-219
C
C  HISTORY:
C      05/29/91  D. Van Rheeden  Initial Release
C
C_____
```

```
C
C      Local Variables
C
C      FACTOR          Normalized magnification factor
C      H               Least-squares model matrix
C      MAXEST          Maximum number of least-squares parameter estimates
C      MAXOBS          Maximum number of least-squares observations
C      NTRACKERS       Number of trackers whose errors are being averaged
C      P               Least-squares estimate covariance matrix
C      SIGMA           Measurement standard deviation of one tracker
C      TRACKER         Tracker index into data arrays
C      W               Least-squares weighting vector
C      XHAT            Least-squares estimate vector
C      Z               Least-squares observation vector
C      ZHAT            Least-squares estimates of tracker locations
C
C_____
C
C      Variable Declarations
C
       IMPLICIT NONE
C
       INCLUDE 'COMMON:PROCPARM.CMN'   ! Processing parameters
       INCLUDE 'COMMON:TKPTPARM.CMN'   ! Processing parameters
C
       INTEGER*2    MAXEST/3/, MAXOBS/24/, NTRACKERS,
     &              TRACKER
C
       REAL*4       FACTOR, H(24,3), P(3,3), SIGMA, W(24),
     &              XHAT(3), ZHAT(24), Z(24)
C
C_____
C              EXECUTABLE CODE
C_____
C
C      Initialize the trackpoint measurement variances, the number of good
C      trackers, and the standard deviation for one tracker.
C
       TPVARX = 0.0
       TPVARY = 0.0
       NTRACKERS = 0.0
       SIGMA = 0.5
C
C      Set the tracker mode to locked on and the breaklock flag to false.
C
       TRKMODE = 1
       BRKLCK = .FALSE.
C
C      For each good tracker at least one cycle old...
C
       DO TRACKER = 1, MAXT
          IF (DBASE(TRACKER,1) .EQ. 2 .AND. DBASE(TRACKER,9) .GE. 1)
     &       THEN
C
C      Assign model matrices and observation vectors used to compute
C      least-squares target aimpoint and size estimates.
C
          H(TRACKER,1) = 1.0
          H(TRACKER,2) = 0.0
```

```
                H(TRACKER,3) = DIST2DX(TRACKER)
                H(TRACKER+MAXT,1) = 0.0
                H(TRACKER+MAXT,2) = 1.0
                H(TRACKER+MAXT,3) = DIST2DY(TRACKER)
C
                Z(TRACKER)         =    DBASE(TRACKER,2)
                Z(TRACKER+MAXT)    =    DBASE(TRACKER,3)
C
C
C   If selected, assign least-squares weights based on the distance of the
C   tracker from the aimpoint.
C
                IF (WEIGHTDIST) THEN
C
                    IF (DISTX(TRACKER) .GT. 0.1) THEN
                        W(TRACKER)= 1.0 / DISTX(TRACKER)
                    ELSE
                        W(TRACKER) = 10.0
                    END IF ! X normalized distance > 0.1

IF (DISTY(TRACKER) .GT. 0.1) THEN
                        W(TRACKER+MAXT) = 1.0 / DISTY(TRACKER)
                    ELSE
                        W(TRACKER+MAXT) = 10.0
                    END IF ! Y normalized distance > 0.1
C
                ELSE ! Don't assign distance weights
C
                    W(TRACKER)        = 1.0
                    W(TRACKER+MAXT)   = 1.0
                END IF ! Assign distance weights
C
C   Increment the number of trackers counter.
C
                NTRACKERS = NTRACERS + 1
C
C   Else, zero the least-squares weights for this tracker.
C
                ELSE
                    W(TRACKER)       = 0.0
                    W(TRACKER+MAXT) = 0.0
                END IF ! This tracker is good and at least 1 cycle old
            End DO ! For all good trackers
C
C   If there are at least two trackers ...
C
            IF (NTRACKERS .GT. 1) THEN
C
C   Use least-squares to estimate aimpoint location and target size.
C
                CALL LEASTSQ (H, Z, W, XHAT, ZHAT, P, MAXEST, MAXOBS)
C
C   Run the integrating jitter test to delete trackers with bad measurements.
C
                DO TRACKER = 1, MAXT
                    PREDX(TRACKER) = ZHAT(TRACKER)
```

```
              PREDY(TRACKER) = ZHAT(TRACKER+MAXT)
          END DO
          CALL INTJITTER
C
C   Recompute the estimated trackpoint location and target size
C   after removing the bad measurements.
C
          DO TRACKER = 1, MAXT
              IF (DBASE(TRACKER,1) .EQ. -1) THEN
                  W(TRACKER) = 0.0
                  W(TRACKER+MAXT) = 0.0
              END IF ! A tracker is not valid.
          END DO ! For all trackers
          CALL LEASTSQ (H, Z, W, XHAT, ZHAT, P, MAXEST, MAXOBS)
C
C   Compute track errors and measurement variances.
C
          RESERRX = XHAT(1) - AIMX
          RESERRY = XHAT(2) - AIMY
          MAGNIFY = XHAT(3)
C
C
          TPVARX = SIGMA**2 * P(1,1)
          TPVARY = SIGMA**2 * P(2,2)
          MAGVAR = SIGMA**2 * P(3,3)
C
C   Compute the aimpoint and trackpoint.
C
          AIMX = XHAT (1)
          AIMY = XHAT (2)
C
          TRACKX = AIMX + MAGNIFY * OFFSETX
          TRACKY = AIMY + MAGNIFY * OFFSETY
C
C   Compute the estimated target sizes based on magnification.
C
          FACTOR = MAGNIFY / INITSIZEX
          RSIZEX = FACTOR * INITSIZEX
          RSIZEY = FACTOR * INITSIZEY
C
C   Else, if there is one tracker ...
C
          ELSE IF (NTRACKERS .GT. 0) THEN
C
C   Find the tracker measurement of the good tracker.
C
          TRACKER = 1
          DO WHILE (W(TRACKER) .EQ. 0.0)
              TRACKER = TRACKER + 1
          END DO ! while searching for the good tracker measurement
C
C   Compute the aimpoint as the offset from the tracker.  Use the estimated
C   magnification from the previous tracker frame.
C
          RESERRX = (Z(TRACKER) - DIST2DX(TRACKER)*MAGNIFY) - AIMX
          RESERRY = (Z(TRACKER+MAXT)-DIST2DY(TRACKER)*MAGNIFY) - AIMY
          TPVARX = SIGMA**2
          TPVARY = SIGMA**2
```

```
C
            AIMX = AIMX + RESERRX
            AIMX = AIMY + RESERRY
            TRACKX = TRACKX + RESERRX
            TRACKY = TRACKY + RESERRY
C
C       Else, set the breaklock flag to true and tracker mode to rate coast.
C
         ELSE
            BRKLCK = .TRUE.
            TRKMODE = 0
         END IF ! There are any trackers
C
         RETURN
         END C_____Section B_____
C
C                    Texas Instruments
C                    TI STRICTLY PRIVATE
C                    Property of Texas Instruments ONLY
C
C_____
C
C       SUBROUTINE TRKNORNG
C
C_____
C
C       NAME:     TRKNORNG
C
C       FUNCTION: Computes the aimpoint and trackpoint when no range
C                 estimates are available.  A least-squares estimator
C                 calculates aimpoint and target size estimates.
C                 Separate X and Y magnification factors are used.
C
C       DESCRIPTION:
C
C           Initialize the trackpoint measurement variances, the number of
C              good trackers, and the standard deviation for one tracker
C           Set the tracker mode to locked on and the breaklock flag to false
C
C           Do for all trackers
C               If a tracker is active and is at least one cycle old Then
C                    Assign model matrices and observation vectors used to compute
C                         least-squares target aimpoint and size estimates
C                    If weight trackers by distance from the aimpoint Then
C                         Assign X distance weights
C                         Assign Y distance weights
C                    Else
C                         Assign all weights to unity
C                    End of If weight trackers by distance from the aimpoint
C                    Increment the number of trackers counter
C               Else this tracker is not active or at least one cycle old
C                    Zero the least-squares weights for this tracker
C               End of If a tracker is active and at least 1 cycle old
C           End of Do for all trackers
C
C           If there are at least two valid trackers Then
```

```
C         Use least-squares to estimate trackpoint location and target size
C         Run the jitter test to delete trackers with bad measurements
C         Recompute the estimated trackpoint location and target size
C             after removing the bad measurements
C         Compute track errors and measurement variances
C         Update the aimpoint and trackpoint by adding in track errors
C         Save the estimated target sizes
C     Else if there is one valid tracker Then
C         Find the tracker measurement of the good tracker
C         Compute the aimpoint as the offset from the tracker
C     Else there are no valid trackers
C         Set the breaklock flag to true
C         Set the tracker mode to rate coast
C     End of If there are valid trackers
C
C REFERENCES:
C     None
C
C CALLING SEQUENCE:
C     Call TRKNORNG
C
C INPUTS:
C     None
C
C OUTPUTS:
C     None
C
C DEPENDENCIES:
C     Common Blocks
C         PROCPARMS - Processing parameters
C         TKPTPARMS - Trackpoint/aimpoint related parameters
C     Subroutines
C         LEASETSQ - Weighted least-squares estimator
C         JITTER -   Robust JITTER test
C
C SIDE EFFECTS:
C     None
C
C TARGET PROCESSOR:
C     VAX 8000 Series VMS 4.5, Fortran Compiler 4.5-219
C
C HISTORY:
C     05/29/91    D. Van Rheeden Initial Release
C     07/29/91    D. Van Rheeden Added subpixel estimates
C
C_____
C
C     Local Variables
C         HX, HY          Least-squares model matrices
C         MAXEST          Maximum number of least-squares parameter estimates
C         MAXOBS          Maximum number of least-squares observations
C         NTRACKERS       Number of trackers whose errors are being averaged
C         PX, PY          Least-squares estimate covariance matrices
C         SIGMA           Measurement standard deviation of one tracker
C         SUMWX, SUMWY    Sum of weight values
C         TRACKER         Tracker index into data arrays
C         WX, WY          Least-squares weighting vectors
C         XHAT, YHAT      Least-squares estimate vectors
```

```
C          ZX, ZY           Least-squares observation vectors
C          ZXHAT, ZYHAT     Least-squares predicted observation vectors
C
C_____
C
C     Variable Declarations
C
      IMPLICIT NONE
C
      INCLUDE 'COMMON:PROCPARM.CMN'      ! Processing parameters
      INCLUDE 'COMMON:TKPTPARM.CMN'      ! Trackpoint parameters
C
      INTEGER*2    MAXEST/2/, MAXOBS/12/, NTRACKERS, TRACKER
C
      REAL*4       HX(12,2), HY(12,2), PX(2,2), PY(2,2), SIGMA,
     &             WX(12), WY(12), XHAT(12), YHAT(12),
     &             ZX(12), ZY(12), ZXHAT(12), ZYHAT(12)
C
C_____
C
C                      EXECUTABLE CODE
C_____
C
C     Initialize the trackpoint measurement variances, the number of
C     good trackers, and the standard deviation for one tracker.
C
      TPVARX    = 0.0
      TPVARY    = 0.0
      NTRACKERS = 0
      SIGMA     = 0.5
C
C     Set the tracker mode to locked on and the breaklock flag to false.
C
      TRKMODE = 1
      BRKLCK  = .FALSE.
C
C     For each good tracker at least one cycle old ...
C
      DO TRACKER = 1, MAXT
        IF (DBASE(TRACKER,1) .EQ. 2 .AND. DBASE(TRACKER,9) .GE. 1) THEN
C
C     Assign model matrices and observation vectors used to compute
C     least-squares target aimpoint and size estimates.
C
          HX(TRACKER,1) = 1.0
          HX(TRACKER,2) = DISTX(TRACKER)
          HY(TRACKER,1) = 1.0
          HY(TRACKER,2) = DISTY(TRACKER)
          ZX(TRACKER)   = DBASE(TRACKER,2) + SUBPIXX(TRACKER)
          ZY(TRACKER)   = DBASE(TRACKER,3) + SUBPIXY(TRACKER)
C
C     If selected, assign least-squares weights based on the distance of the
C     tracker from the aimpoint.
C
          IF (WEIGHTDIST) THEN
C
C
```

```
            IF (DISTX(TRACKER) .GT. 0.1) THEN
                WX(TRACKER) = 1.0 / DISTX(TRACKER)
            ELSE
                WX(TRACKER) = 10.0
            END IF ! X normalized distance > 0.1
C
            IF (DISTY(TRACKER) .GT. 0.1) THEN
                WY(TRACKER) = 1.0 / DISTY(TRACKER)
            ELSE
                WY(TRACKER) = 10.0
            END IF ! Y normalized distance > 0.1
C
        ELSE ! Don't assign distance weights
C
            WX(TRACKER) = 1.0
            WX(TRACKER) = 1.0
C
        END IF ! Assign distance weights
C
C   Increment the number of trackers counter.
C
C
C
            NTRACKERS = NTRACKERS + 1
C
C
C   Else, zero the least-squares weights for this tracker.
C
        ELSE
            WX(TRACKER) = 0.0
            WY(TRACKER) = 0.0
        END IF ! This tracker is good and at least 1 cycle old
    END DO ! For all good trackers
C
C   If there are at least two trackers ...
C
    IF (NTRACKERS .GT. 1) THEN
C
C   Use least-squares to estimate aimpoint location and target size.
C
        CALL LEASTSQ (HX, ZX, WX, XHAT, PX, ZXHAT, MAXEST, MAXOBS)
        CALL LEASTSQ (HY, ZY, WY, YHAT, PY, ZYHAT, MAXEST, MAXOBS)
C
C   Run the jitter test to delete trackers with bad measurements.
C
        DO TRACKER = 1, MAXT
            PREDX(TRACKER) = ZXHAT(TRACKER)
            PREDY(TRACKER) = ZYHAT(TRACKER)
        END DO
        CALL JITTER
C
C   Recompute the estimated trackpoint location and target size
C   after removing the bad measurements.
C
        DO TRACKER = 1, MAXT
            IF (DBASE(TRACKER,1) .EQ. -1) THEN
                WX(TRACKER) = 0.0
                WY(TRACKER) = 0.0
            END IF ! A tracker is not valid.
        END DO ! For all trackers
```

```
              CALL  LEASTSQ (HX, ZX, WX, XHAT, PX, ZXHAT, MAXEST, MAXOBS)
              CALL  LEASTSQ (HY, ZY, WY, YHAT, PY, ZYHAT, MAXEST, MAXOBS)
C
C     Compute track errors and measurement variances.
C
              RESERRX = XHAT(1) - AIMX
              RESERRY = YHAT(1) - AIMY
              TPVARX  = SIGMA**2 * PX(1,1)
              TPVARY  = SIGMA**2 * PY(1,1)
C
C     Update the aimpoint and trackpoint by adding track errors.
C
              AIMX = AIMX + RESERRX
              AIMY = AIMY + RESERRY
C
              TRACKX = TRACKX + RESERRX
              TRACKY = TRACKY + RESERRY
C
C     Save the estimated target sizes.
C
              RSIZEX = XHAT(2)
              RSIZEY = YHAT(2)
C
C     Else, if there is one tracker ...
C
          ELSE IF (NTRACKERS .GT. 0) THEN
C
C     Find the tracker measurement of the good tracker.
C
              TRACKER = 1
              DO WHILE (WX(TRACKER) .EQ. 0.0)
                  TRACKER = TRACKER + 1
              END DO ! while searching for the good tracker measurement
C
C     Compute the aimpoint as the offset from the tracker.
C
              RESERRX = (ZX(TRACKER) - DISTX(TRACKER) * RSIZEX) - AIMX
              RESERRY = (ZY(TRACKER) - DISTY(TRACKER) * RSIZEY) - AIMY
              TPVARX  = SIGMA**2
              TPVARY  = SIGMA**2
C
              AIMX = AIMX + RESERRX
              AIMY = AIMY + RESERRY
              TRACKX = TRACKX + RESERRX
              TRACKY = TRACKY + RESERRY
C
C     Else, set the breaklock flag to true and tracker mode to rate coast.
C
          ELSE
              BRKLCK = TRUE.
              TRKMODE = 0
          END IF ! There are any trackers
C
          RETURN
          END
```

```
C
C                               Section C
C                             Texas Instruments
C                           T I   STRICTLY PRIVATE
C                         Property of Texas Instruments ONLY
C
C
C        SUBROUTINE INTJITTER
C
C
C        NAME: INTJITTER
C
C        FUNCTION:    Performs the integrating robust jitter test for the 2-D range
C                     independent track model.
C
C        DESCRIPTION:
C              Initialize the number of trackers to zero
C              For each good tracker at least one cycle old
C                    Increment the number of trackers counters
C                    Compute the difference between found and predicted
C                    Save the difference in a temporary vector
C              End of loop
C
C              If at least 3 trackers are present then
C                    Compute the median of the difference values
C                    Compute the median absolute deviations of the difference values
C                    For each good tracker at least one cycle old
C                          Jitter value = ((Difference - Median) / MAD)**2
C                          If the either jitter value > threshold then
C                                Execute routine to delete the tracker
C                                Set the appropriate reason for deletion flag to true
C                          End of if
C                    End of loop
C              End of if
C
C        REFERENCES:
C              None
C
C
C
C        CALLING SEQUENCE:
C              CALL INTJITTER
C
C        INPUTS:
C              None
C
C        OUTPUTS:
C              None
C
C        DEPENDENCIES:
C              Common Blocks
C                    PROCPARMS - Processing parameters
C              Functions
C                    MEDIAN - Calculates median of a vector of samples
C
C        SIDE EFFECTS:
C              None
C
C        TARGET PROCESSOR:
C              VAX 8000 series VMS 4.5, Fortran Compiler 4.5-219
C
```

```
C     HISTORY:
C            06/20/91  D. Van Rheeden  Initial Release
C
C_____
C
C     Local Variables
C
C            DIFF             Differences between the found and predicted locations
C            ERROR            Vertical and horizontal errors of good trackers only
C            JITRX,JITRY      Vertical and horizontal jitter scores
C            MAD_ERROR        Median absolute deviation of track errors
C            MEDIAN_ERROR     Median of track errors
C            MINMAD           Minimum allowed median absolute deviation
C            NTRACKERS        Number of good trackers
C            NSAMPLES         Number of samples to compute median/MAD
C            THRESH           Threshold for the jitter test
C            TRKR             Tracker index (position in the databases)
C
C_____
C     Variable Declarations
C
        IMPLICIT NONE
C
        INCLUDE 'COMMON:PROCPARM.CMN'  ! Processing parameters
C
        INTEGER*2   NSAMPLES, NTRACKERS, TRKR
C
        REAL*4      DIFF(24), ERROR(24), JITRX, JITRY, MAD_ERROR,
     &              MEDIAN, MEDIAN_ERROR, MINMAD /0.5/
C
        REAL*4      THRESH(24) /0.0, 0.0,18.5,20.6,21.2,16.3,
     &                          13.7, 12.3,12.3,12.3,12.3,12.3,
     &                          12.3, 12.3,12.3,12.3,12.3,12.3,
     &                          12.3, 12.3,12.3,12.3,12.3,12.3/
C
C
        REAL*4      THRESH(24) /0.0,0.0,5.0,5.0,5.0,5.0,
     &                          5.0,5.0,5.0,5.0,5.0,5.0,
     &                          5.0,5.0,5.0,5.0,5.0,5.0,
     &                          5.0,5.0,5.0,5.0,5.0,5.0/
C
        EXTERNAL    MEDIAN
C
C_____
C
C                       EXECUTABLE CODE
C
C_____
C
C     Count the number of good trackers and compute the differences between the
C     predicted and the found locations.
C
C
        NTRACKERS = 0
        DO TRKR = 1, MAXT
          IF (DBASE(TRKR,1) .EQ. 2) THEN
            NTRACKERS = NTRACKERS + 1
            DIFF (2*TRKR-1) = FLOAT(DBASE)(TRKR,2)) - PREDX(TRKR)
```

```
              DIFF (2*TRKR) = FLOAT(DBASE(TRKR,3)) - PREDY(TRKR)
              ERROR(2*NTRACKERS-1) = DIFF(2*TRKR-1)
              ERROR(2*NTRACKERS) =   DIFF(2*TRKR)
            END IF
          END DO
          NSAMPLES = 2 * NTRACKERS
C
C    If there are at least three good trackers Then do the jitter test.
C
          IF (NSAMPLES .GE. 3) THEN
C
C    Compute the jitter median.
C
          MEDIAN_ERROR = MEDIAN (ERROR, NSAMPLES)
C
C    Compute the jitter median absolute deviation (MAD).
C
          NTRACKERS = 0
          DO TRKR = 1, MAXT
            IF (DBASE(TRKR,1) .EQ. 2) THEN
              NTRACKERS = NTRACKERS + 1
              ERROR(2*NTRACKERS-1) = ABS (DIFF(2*TRKR-1) - MEDIAN_ERROR)
              ERROR(2*NTRACKERS)   = ABS (DIFF(2*TRKR)   - MEDIAN_ERROR)
            END IF
          END DO
C
          MAD_ERROR = MAX ((MEDIAN (ERROR, NSAMPLES) / 0.6745), MINMAD)
C
C    For each good tracker compute the jitter test scores.
C
          DO TRKR = 1, MAXT
            IF (DBASE(TRKR,1) .EQ. 2 .AND. DBASE(TRKR,9) .GT. 0) THEN
              JITRX = ((DIFF(2*TRKR-1) - MEDIAN_ERROR) / MAD_ERROR)**2
              JITRY = ((DIFF(2*TRKR)   - MEDIAN_ERROR) / MAD_ERROR)**2
C
D             WRITE (TRLUN(TRKR), *)
D             WRITE (TRLUN(TRKR), 10) 'JITRX =', JITRX, 'JITRY =', JITRY
D  10         FORMAT(2(5X,A7,F6.2))
C
C    If the jitter scores fail, delete the tracker from the database and set the
C    reason flag. Scale the jitter values to save in integer database.
C
              IF (JITRX .GT. THRESH(NSAMPLES) .OR.
     &            JITRY .GT. THRESH(NSAMPLES)) THEN
                CALL DBDEL(TRKR)
                REASONS(2,TRKR) = .TRUE.
              END IF
C
              DBASE(TRKR,14) = 100 * JITRX
              DBASE(TRKR,15) = 100 * JITRY
C
            END IF ! good tracker
C
          END DO ! trkr = 1 to maxt
C
C    Else, if not enough trackers, set the jitter values to zero
C
```

```
          ELSE
            DO TRKR = 1, MAXT
              IF (DBASE(TRKR,1) .EQ. 2) THEN
                DBASE(TRKR,14) = 0
                DBASE(TRKR,15) = 0
D               WRITE (TRLUN(TRKR), *)
D               WRITE (TRLUN(TRKR), *) 'JITRX = 0.0JITRY = 0.0'
              END IF ! existing tracker
            END DO ! i = 1, maxt
C
          END IF ! ntrackers > = 3
C
          RETURN
          END
```

Section D

```
C_____
C
C                          Texas Instruments
C                         T I   I N T E R N A L   D A T A
C                         Property of Texas Instruments ONLY
C_____
C
C    NAME:     JITTER
C
C    FUNCTION:     Performs the robust jitter test
C
C    DESCRIPTION:
C        Initialize the number of trackers to zero
C        For each good tracker at least one cycle old
C            Increment the number of trackers counters
C            Compute the difference between found and predicted
C            Save the difference in a temporary vector
C        End of loop
C
C        If at least 3 trackers are present then
C            Compute the median of the difference values
C            Compute the median absolute deviation of the difference values
C            For each good tracker at least one cycle old
C                Jitter value = (Difference - Median)**2 / MAD **2
C                If the either jitter value > threshold then
C                    Execute routine to delete the tracker
C                    Set the appropriate reason for deletion flag to true
C                End of if
C            End of loop
C        End of if
C
C    REFERENCES:
C        None
C
C_____
C
C    CALLING SEQUENCE:
C        CALL JITTER
C
C    INPUTS:
```

```fortran
C           None
C
C       OUTPUTS:
C           None
C
C       DEPENDENCIES:
C           Common Blocks
C               PROCPARMS - Processing parameters
C           Functions
C               MEDIAN - Calculates median of a vector of samples
C
C       SIDE EFFECTS:
C           None
C
C       TARGET PROCESSOR:
C           VAX 8000 series VMS 4.5, Fortran Compiler 4.5-219
C
C       HISTORY:
C           11/03/88 R. Broussard Initial Release
C           01/28/91 D. Van Rheeden Replaced mean and standard deviation with median
C                                   and median abs deviation
C
C_____
C
C   Local Variables
C
C       NTRACKERS           Number of good trackers
C       DIFFX, DIFFY        Differences between the found and predicted locations
C       ERRX, ERRY          Vertical and horizontal errors of good trackers only
C       JITRX, JITRY        Vertical and horizontal jitter scores
C       MADX, MADY          Median absolute deviation of X and Y track errors
C       MEDIANX, MEDIANY    Median of X and Y track errors
C       MINMAD              Minimum allowed median absolute deviation
C       THRESH              Threshold for the jitter test
C       TRKR                Tracker index (position in the database)
C
C_____
C
C   Variable Declarations
C
        IMPLICIT NONE
C
        INCLUDE 'COMMON:PROCPARM.CMN' ! Processing parameters
C
        INTEGER*2  NTRACKERS, TRKR
C
        REAL*4     DIFFX (12), DIFFY(12), ERRX(12), ERRY(12), JITRX,
     &             JITRY, MADX, MADY, MEDIAN, MEDIANX, MEDIANY,
     &             MINMAD /0.5/
C
        REAL*4     THRESH(12) /0.0, 0.0, 18.5, 20.6, 21.2, 16.3,
     &             13.7, 12.3, 12.3, 12.3, 12.3, 12.3 /
C       REAL*4     THRESH(12) /0.0, 0.0, 5.0, 5.0, 5.0, 5.0,
C    &             5.0, 5.0, 5.0, 5.0, 5.0, 5.0 /
C
        EXTERNAL  MEDIAN
C
```

```
C_____
C
C                        EXECUTABLE CODE
C
C_____
C
C     Count the number of good trackers and compute the difference between the
C     predicted and the found locations.
C
      NTRACKERS = 0
      DO TRKR = 1, MAXT
         IF (DBASE(TRKR,1) .EQ. 2) THEN
            NTRACKERS = NTRACKERS + 1
            DIFFX(TRKR) = FLOAT (DBASE(TRKR, 2)) - PREDX(TRKR)
            DIFFY(TRKR) = FLOAT (DBASE(TRKR,3)) - PREDY(TRKR)
            ERRX (NTRACKERS) = DIFFX (TRKR)
            ERRY (NTRACKERS) = DIFFY (TRKR)
         END IF
      END DO
C
C     If there are at least three good trackers Then do the jitter test.
C
      IF (NTRACKERS .GE. 3) THEN
C
C     Compute the jitter median.
C
            MEDIANX = MEDIAN ( ERRX, NTRACKERS )

MEDIANY = MEDIAN ( ERRY, NTRACKERS )
C
C     Compute the jitter median absolute deviation (MAD).
C
         NTRACKERS = 0
         DO TRKR = 1, MAXT
            IF (DBASE(TRKR,1) .EQ. 2) THEN
               NTRACKERS = NTRACKERS + 1
               ERRX (NTRACKERS) = ABS ( DIFFX(TRKR) - MEDIANX )
               ERRY (NTRACKERS) = ABS ( DIFFY(TRKR) - MEDIANY )
            END IF
         END DO
C
         MADX = MAX ( (MEDIAN( ERRX, NTRACKERS ) / 0.6745), MINMAD )
         MADY = MAX ( (MEDIAN( ERRY, NTRACKERS ) / 0.6745), MINMAD )
C
C     For each good tracker compute the jitter test scores.
C
         DO TRKR = 1, MAXT
            IF (DBASE(TRKR,1) .EQ. 2 .AND. DBASE (TRKR, 9) .GT. 0) THEN
               JITRX = (DIFFX(TRKR) - MEDIANX)**2 / MADX**2
               JITRY = (DIFFY(TRKR) - MEDIANY)**2 / MADY**2
C
D              WRITE (TRLUN(TRKR), *)
D              WRITE (TRLUN(TRKR), 10) 'JITRX =', JITRX, 'JITRY =', JITRY
D  10          FORMAT (2(5X,A7,F6.2))
C
C     If the jitter scores fail, delete the tracker from the database and set the
C     reason flag. Scale the jitter values to save in integer database.
C
```

```
                  IF (JITRX .GT. THRESH (NTRACKERS) .OR.
         &           JITRY .GT. THRESH (NTRACKERS)) THEN
                        CALL DBDEL (TRKR)
                        REASONS (2,TRKR) = .TRUE.
                  END IF
C
                  IF (JITRX .LT. (2**15-1) /100) THEN
                     DBASE (TRKR,14) = 100 * JITRX
                  ELSE
                     DBASE (TRKR,14) = (2**15-1) /100
                  END IF
C
                  IF (JITRY .LT. (2**15-1) /100) THEN
                     DBASE (TRKR, 15) = 100 * JITRY
                  ELSE
                     DBASE (TRKR,15) = (2**15-1) / 100
                  END IF
C
               END IF ! good tracker
C
            END DO ! trkr = 1 to maxt
C
C       Else if not enough trackers, set the jitter values to zero
C
            ELSE
               DO TRKR = 1, MAXT
                  IF (DBASE (TRKR,1) .EQ. 2) THEN
                     DBASE (TRKR,14) = 0
                     DBASE (TRKR,15) = 0
D                    WRITE (TRLUN (TRKR), *)
D                    WRITE (TRLUN (TRKR), *)' JITRX = 0.0  JITRY = 0.0'
                  END IF ! existing tracker
               END DO ! i = 1, maxt
C
            END IF ! ntrackers > =3
C
            RETURN
            END C_____Section E_____
C
C                          Texas Instruments
C                        T I  I N T E R N A L  D A T A
C                        Property of Texas Instruments ONLY
C
C_____
C
            SUBROUTINE LEASTSQ (H, Z, W, XHAT, ZHAT, P, NEST, NOBS)
C
C_____
C
C     NAME:   LEASTSQ
C
C     FUNCTION:   Weighted least-squares estimator. The estimator uses
C                 the standard form:
C
C
C                      x = (H^T * W * H)^{-1} * H^T * W * z
C
```

```
C     where
C         x = vector of least-squares estimates
C         z = vector of input observations
C         H = least-squares model matrix
C         W = weighting matrix
C
C     The predicted observations are computed by:
C
C
C         z = W * H * (H^T * W * H)^-1 * H^T * W * z
C
C  DESCRIPTION:
C
C
C     Compute the matrix product HW = H^T * W
C     Compute the matrix product HW * H and invert the result
C     Save the least-squares estimate covariance matrix
C     Compute the least-squares pseudo-inverse matrix
C     Computer the least-squares estimates
C     Compute the observation estimates
C
C  REFERENCES:
C     Elbert, T. F., Estimation and Control of Systems, Van Nostrand
C     Reinhold Co., 1984, pp. 367-369.
C
C_____
C
C  CALLING SEQUENCE:
C     CALL LEASTSQ (H, Z, W, XHAT, ZHAT, P, NEST, NOBS)
C
C  INPUTS:
C     H      - Least-squares model matrix
C     NEST   - Number of least-squares estimates to compute
C     NOBS   - Number of least-squares observations to compute
C     W      - Weight vector
C     Z      - Vector of observations
C
C  OUTPUTS:
C     P      - Least-squares estimate normalized covariance matrix
C     XHAT   - Vector of least-squares estimates
C     ZHAT   - Vector of predicted observations
C
C  DEPENDENCIES:
C    Subroutines
C        MATINV   - Inverts a matrix
C        MATMULT  - Multiplies two matrices
C        MATTRAN  - Transposes a matrix
C        MVMULT   - Multiplies a matrix by a column vector
C
C  SIDE EFFECTS:
C       If the number of estimates or the number of observations become
C       larger than the local matrix dimensions, then the local matrix
C       dimensions must be increased.
C
C  TARGET PROCESSOR:
C       VAX 8000 series VMS 4.5, Fortran Compiler 4.5-219
C
```

```
C     HISTORY:
C         05/30/91   D. Van Rheeden Initial Release
C
C_____
C
C     Local Variables
C
C         I, J      Matrix loop indexes
C         HTW       Product of transposed model matrix and weights
C         HTWHINV   Inverse of the product HTW * H
C         OBS       Observation estimate model matrix
C         PSINV     Least-squares pseudo-inverse matrix
C         WTH       Transpose of the product HTW
C
C_____
C
C     Variable Declarations
C
      IMPLICIT NONE
C
      INCLUDE 'COMMON:PROCPARM.CMN'  ! Processing parameters
C
      INTEGER*2  I, J, NEST, NOBS
C
      REAL*4     H(NOBS,NEST), HTW(3,24), HTWH(3,3),
     &           OBS(24,24), P(NEST,NEST), PSINV(3,24),
     &           TEMP(3,3), W(NOBS), XHAT(NEST), WTH(24,3),
     &           Z(NOBS), ZHAT(NOBS)
C
C_____
C
C                    EXECUTABLE CODE
C
C_____
C
C     Compute the matrix product HW = H^T * W. Note that W is input as a
C     vector instead of a matrix to reduce the number of computations.
C
      CALL MATTRAN (H, HTW, NOBS, NEST)
      DO = 1, NEST
        DO J = 1, NOBS
          HTW(I,J) = W(J) * HTW(I,J)
        END DO
      END DO
C
C     Compute the matrix product H^T * W * H and invert. Save the result as
C     the normalized covariance matrix of the least-squares estimates.
C
      CALL MATMULT (HTW, H, HTWH, NEST, NOBS, NOBS, NEST)
      CALL MATINV (HTWH, P, TEMP, NEST, NEST)
C
C     Compute the least-squares pseudo-inverse matrix.
C
      CALL MATMULT (P, HTW, PSINV, NEST, NEST, NEST, NOBS)
C
```

```
C      Compute the least-squares estimates, x.
C
       CALL MVMULT (PSINV, Z, XHAT, NEST, NOBS, NOBS)
C
C      Compute the observation estimates, z.
C
       CALL MATTRAN (HTW, WTH, NEST, NOBS)
       CALL MATMULT (WTH, PSINV, OB , NOBS, NEST, NEST, NOBS)
       CALL MVMULT (OBS, Z, ZHAT, NOBS, NOBS, NOBS)
C
       RETURN
       END
```

```
C                          Section F
C_____
C                       Texas Instruments
C                       T I INTERNAL DATA
C                   Property of Texas Instruments ONLY
C_____
C
C      COMMON BLOCK TKPTPARM
C
C
C      MNEUMONIC:  TRacKPoinT measurement PARaMeters common block
C
C      AUTHOR:     Don Van Rheeden
C
C      HISTORY:
C      01/09/91    D. Van Rheeden Initial release
C
C
C                       VARIABLE DECLARATIONS
C
C
           COMMON TKPTPARMS/ AMOUNT_SHIFTED, BIAS_COUNT,
        &  BIAS_INTERVAL,
        &  BIASX, BIASY, COMPUTE_SUBPIX, DISP_UPPER,
        &  DISTX, DISTY, DIST2DX, DIST2DY,
        &  INITSIZEX, INITSIZEY, MAGNIFY, MAGVAR,
        &  MODEL, OFFSETX, OFFSETY, RANGEIND,
        &  RECEMTERP, RECENERY, SAVED LOSP,
        &  SUBPIXX, SUBPIXY, TRKMODE, WEIGHTDIST/
C
           INTEGER *2   BIAS COUNT INITSIZEX, INITSIZEY, MODEL,
        &               RECENTERX, RECENTERY, TRKMODE
C
           REAL *4      AMOUNT_SHIFTED, BIAS_INTERVAL, BIASX,
        &               BIASY, DISP_CORR, DISP_UPPER, DISTX(12),
        &               DISTY (12), DIST2DX(12), DIST2DY(12), MAGNIFY,
        &               MAGVAR, OFFSETX, OFFSETY, SAVED_LOSP,
        &               SUBPIXX(12), SUBPIXY(12)
C
           LOGICAL*2    COMPUTE_SUBPIX, RANGEIND, WEIGHTDIST
C
C                       VARIABLE DESCRIPTIONS
```

```
C
C      AMOUNT_SHIFTED  Number of meters shifted on target by aimpoint bias
C      BIAS_COUNT      Aimpoint bias counter
C      BIAS_INTERVAL   Number of seconds between aimpoint biases
C      BIAS X, Y       Aimpoint biasing weights:
C                         BIASX=0.0 -bias left BIASY=0.0 -bias down
C                         BIASX=0.5 -no bias BIASY=0.5 -no bias
C                         BIASX=1.0 -bias right BIASY=1.0 -bias up
C      COMPUTE_SUBPIX  Compute subpixel esteimate flag
C      DIST2DX,Y       Distances normalized by 2-D magnification
C      INITSIZEX,Y     Target size at tracker initialization
C      MAGNIFY         Estimated magnifications factor
C      MAGVAR          Variance of the magnification factor estimate
C      MODEL           Range independent tracking model:
C                         1- 1-D Model (X & Y estimated independently)
C                         2- 2-D Model (X & Y estimated simultaneously)
C      OFFSETX,Y       Offset of aimpoint from trackpoint
C      RANGEIND        Range independent tracking flag
C      RECENTERP, Y    Aimpoint recenter values (PITCH, YAW)
C      SAVED_LOSP      Line-of-sight pitch saved from last aimpoint bias
C      SUBPIXX,Y       Trackpoint subpixel shift estimates
C      TRKMODE         Integer tracker mode:
C                         0 - rate coast (breaklock)
C                         1 - locked on (confident track)
C      WEIGHTDIST      Flag to weight each tracker measurement by its distance from
C                      the aimpoint
C      DISP_CORR       Average displacement all correlators
C      DISP_UPPER      Average displacement of upper correlators
C      DISTX,Y         Distances from trackpoint normalized by size
C_____
C                      Texas Instruments
C                      TI INTERNAL DATA
C                      Property of Texas Instruments ONLY
C_____
C
C      COMMON BLOCK PROCPARM
C
C      MNUEMONIC: PROCessing PARaMeters common block
C
C      AUTHOR:    Roger Broussard
C
C      HISTORY:
C      10/31/88   R. Broussard   Generated from program TRACK written by
C                                Cam Vaszas for AGB program
C      1/09/90    D. Van Rheeden Added variables to run AAWS-M images
C      4/11/91    D. Van Rheeden Removed oresight jutter: XTRAN, YTRAN
C      4/15/91    D. Van Rheeden Added image dimensions: IMGROWS,
C                                IMGCOLS
C      4/17/91    D. Van Rheeden Added max limits; MAXACF, MAXCONT
C      4/22/91    D. Van Rheeden Added screen limits: MINX, Y and MAXX,Y
C      5/20/91    D. Van Rheeden Added CONTTH MIN: removed HSKIP, VSKIP
C      5/24/91    D. Van Rheeden Added trackability/ update to REASONS
C      5/24/91    D. Van Rheeden Added reference update age threshold
C      5/28/91    D. Van Rheeden Added real target, noisex,
C      6/13/91    D. Van Rheeden Added line of sight angles, LOSP, Y
C      6/17/91    D. Van Rheeden Replaced IRRES with RAD_TO_PIX,
C                                PIX_TO_RAD
C      6/17/91    D. Van Rheeden Added last fram X,Y coordinates to DBASE
C
```

```
C                          VARIABLE DECLARATIONS
C
        COMMON /PROCPARMS/ACOR, AGETH, AIMX, AIMY, ALTITUDE,
     &           APMODE, BRKLCK, CCOR, CFT, CHECKS, COLOR,
     &           CONT, CONTTH,CONTTH_MIN, CYCLE, DBASE,
     &           DCHISL, DCHISU, DCREFX, DCREFY, DCSERX,
     &           DCSERY, DRANGE, FRATE, HGREFX, HGREFY,
     &           IMGCOLS, IMGGAIN, IMGROWS, LOSP, LOSY LOSRP,
     &           LOSRY, LUNN, MAXACF, MAXCONT, MAXP, MAXT,
     &           MAXX, MAXY, MINX, MINY, NZSIGMA, OLDRNG,
     &           PIX_TO_RAD, PREDX, PREDY, RAD_TO_PIX,
     &           RANGE, RANGE_GOOD, REASONS, RESERRX, RESERRY,
     &           RSIZEX, RSIZEY, SR, SRTH, TGTSZX, TGTSZY, TPVARX,
     &           TPVARY, TRACKX, TRACKY, TRLUN, VELOCITY
C
        INTEGER*2 AGETH, CHECKS, CONT, CONITH, CONTTHIN, CYCLE,
     &      DBASE(12,17), DCHISL, DCHISU, DCREFX, DCREFY,
     &      DCSERX, DCSERY, HGREFX, HGREFY, IMGCOLS,
     &      IMGROWS, LUNN, MAXACF, MAXCONT, MAXP, MAXT,
     &      MAXX, MAXY, MINX, MINY, SR, SRTH, TRLUN(12)
C
        INTEGER*4 ACOR(25,25), APMODE, CCOR(25,25), COLOR(12)
C
        REAL*4   AIMX, AIMY, ALTITUDE, DRANGE, FRATE,
     &      IMGGAIN, LOSP, LOSY, LOSRP, LOSRY, NZSIGNMA,
     &      OLDRNG, PIX_TO_RAD, PREDX(12), PREDY(12),
     &      RAD_TO_PIX, RANGE, RESERRX, RESERRY RSIZEX,
     &      RSIZEY, SUMP, SUMY, TGRSZX, TGTSZY, TPVARX,
     &      TPVARY, TRACKX, TRACKY, VELOCITY
C
        LOGICAL*2 BRKLCK, CFT/.TRUE./, RANGE_GOOD, REASONS(4,12)
C
C                         VARIABLE DESCRIPTIONS
C
C ACOR,CCOR     Auto-correlation and cross-correlation matrices
C AGETH         Reference update tracker age threshold
C AIMX, AIMY    Horizontal and vertical position of the aimpoint (0.0,0.0 in upper left)
C APMODE        Autopilot mode
C ALTITUDE  Altitude of the platform (meters)
C BRKLCK        Breaklock flag (no good tackers in database)
C CHECKS        Total number of checks allowed this cycle
C CFT           Captive flight test indicator
C COLOR         The color index used to identify trackers
C CONT, SR      Current local contrast and sharpness ratio scores
C CONTTH, SRTH    Local contract and sharpness ratio thresholds
C CONNTH_MIN   Minimum allowed local contrast threshold
C CYCLE         Track cycle number, 0 = Initialization cycle
C DBAS(j,k)     Tracker data base
C               DBASE(j,1):    -1 = slot free, 2==> slot full
C               DBASE(j,2):    X coordinate for tracker j
C               DBASE(j,3):    Y coordinate for tracker j
C               DBASE(j,4):    Local contrast score
C               DBASE(j,5):    Sharpness ratio score
C               DBASE(j,6):    Zone number
C               DBASE(j,7):    -1==> outside OSR (needs replacement)
C                              2==> in bounds
C               DBASE(j,8):    Reference update threshold
C               DBASE(j,9):    Cycles active
```

```
C                DBASE(j,10): Cross correlation score at best match
C                DBASE(j,11): X predicted position
C                DBASE(j,12): Y predicted position
C                DBASE(j,13): Reference update flag:
C                        -1 ==> reset
C                         2 ==> set (perform reference update)
C                DBASE(j,14): Jitter test X score
C                DBASE(j,15): Jitter text Y score
C                DBASE(j,16): X coordinate from last frame
C                DBASE(j,17): Y coordinate from last frame
C DCHISL, DCHISU   Lower and upper thresholds for the local contrast histogram
C                  computation
C DCREFX, DCREFY   Horizontal and vertical size of the reference array
C DCSERX, DCSERY   Horizontal and vertical size of the search array
C DRANGE           Change in slant range between each image (meters/frame)
C FRATE            Frame rate (seconds/frame)
C HGREFX, HGREFY   Horizontal and vertical size of the reference are used
C                  to compute the local contrast
C IMGCOLS, IMGROWS Image horizontal and vertical dimensions
C IMGGAIN          Image global gain
C LOSP, LOSY       Pitch/Yaw line-of-sight angles (radians)
C LOSRP, LOSRY     Pitch/Yaw line-of-sight rates (radians/sec)
C LUNN             Logical unit number counter for tracker output
C MAXACF           Maximum number of autocorrelation function shape tests
C MAXCONT          Maximum number of local contrast tests
C MAXP             Number of parameters per tracker (==> DBASE(i,MAXP))
C MAXT             Maximum number of trackers allowed
C                  (==>DBASE(MAXT,j))
C MAXX, MAXY       Maximum horizontal and vertical search area boundaries
C MINX, MINY       Minimum horizontal and vertical search area boundaries
C NZSIGMA          Standard deviation of the image noise
C OLDRNG           Previous target range
C PIX_TO_RAD       Pixels to radians conversion factor
C PREDX, PREDY     Floating point values for predicted tracker locations
C RAD_TO_PIX       Radians to pixels conversion factor
C RANGE            Slant range (meters)
C RANGE_GOOD       Range good indicator
C REASONS          Reason flags for why tracker was deleted or updated:
C                  REASONS(1,x)- Tracker is out-of-bounds,
C                  REASONS(2,x)- Tracker failed jitter test
C                  REASONS(3,x)- Tracker failed trackability tests
C                  REASONS(4,x)- Tracker reference update occurred
C RESERRX,RESERRY  Correlation residual error (pixels)
C RSIZEX, RSIZEY   Real-value target size for limiting subimage search
C SUMP, SUMY       Pitch/ Yaw integrated line-of-sight (radians)
C TGTSZX, TGTSZY   Target size for limiting subimage search region
C TPVARX, TPVARY   Trackpoint measurement variance
C TRACKX, TRACKY   Horizontal and vertical position of the trackpoint
C                  (0.0, 0.0 in upper left)
C TRLUN            Logical unit numbers for the existing trackers
C VELOCITY         Velocity of the platform (meters/second)
C
C .
```

```
C                          Section G
C_____
C                        Texas Instruments
C                        TI INTERNAL DATA
C                 Property of Texas Instruments ONLY
C_____
C
C     SUBROUTINE DBDEL (TRACKER)
C
C     NAME:    DBDEL
C
C     FUNCTION:   Deletes a tracker from the database
C
C     DESCRIPTION:
C     Set the values of the tracker location to -1
C     Compute the location of the reference subin. age in B memory
C     Clear the region of B memory used for the reference subimage
C
C     REFERENCES:
C     None
C
C     CALLING SEQUENCE:
C         Call DBDEL (TRACKER)
C
C     INPUTS:
C         TRACKER - Index of tracker to delete
C
C     OUTPUTS:
C         None
C
C     DEPENDENCIES:
C         Common Blocks
C             ASPMEMYS - APAP A and B memories
C             PROCPARMS - Processing parameters
C
C     SIDE EFFECTS:
C         None
C
C     TARGET PROCESSOR:
C         VAX 8000 series VMS 4.5, Fortran Compiler 4.5 -219
C
C     HISTORY:
C         11/08/88   R. Broussard    Initial Release
C              Local Variables
C         I,J      Loop counters
C         MXSTRT   Starting column of reference subimage in B memory
C         MYSTRT   Starting row of reference subimage in B memory
C
C     Variable Declarations
C
      IMPLICIT NONE
C
      INCLUDE 'COMMON: APMEMY. CMN! '  APAP A and B memories
      INCLUDE 'COMMON:PROGPARM. CMN! ' Processing parameters
C
      INTEGER*2      I, J, MXSTRT, MYSTRT, TRACKER
C
```

```
C
C_____
                           EXECUTABLE CODE
C_____
C
C    Set the tracker indicator in the database to indicate available.
C
     DBASE( TRACKER,1) = -1
C
C    Determine the location of the tracker in B memory.
C
         MXSTRT = MOD( TRACKER-1, 8) *16 +1
         MYSTRT = (( TRACKER-1)/8 * 16 +1
C    Erase reference image and label from B memory.
C
         DO J = 1, 16
           DO I = 1, 16
             DMEMYB( MXSTRT+I-1, MYSTRT+J-1) = 0
           END DO
         END DO
C
C    For Debugging ...
C
D        CLOSE( UNIT=TRLUN( TRACKER))
C
     RETURN
     END C_____
C
C                         Texas Instruments
C                         TI INTERNAL DATA
C                    Property of Texas Instruments ONLY
C
C_____
C
         REAL*4 FUNCTION MEDIAN (VECTOR, NSAMPLES)
C
C_____
C
C    NAME:      MEDIAN
C
C    FUNCTION:  Computes the median of a vector of numbers.
C
C    DESCRIPTION:
C        Sort the input vector from smallest to largest
C        If the number of input samples is even Then
C          Median = average of two middle samples
C        Else the number of input samples is odd
C          Median = middle sample
C        End If
C
C    REFERENCES:
C        None
C
C_____
C
```

```
C       CALLING SEQUENCE:
C           MEDIAN_VALUE = MEDIAN (VECTOR, NSAMPLES)
C
C       INPUTS:
C           VECTOR   - Input vector containing samples to process
C           NSAMPLES - Number of samples in VECTOR
C
C       OUTPUTS:
C           MEDIAN - Output median value
C
C       DEPENDENCIES:
C           None
C
C       SIDE EFFECTS:
C           None
C
C       TARGET PROCESSOR:
C           VAX 8000 series VMS 4.5, Fortran Compiler 4.5-219
C
C       HISTORY:
C           01/28/91    D. Van RheedenInitial Release
C           06/20/91    D. Van RheedenReduced outer sorting loop from N-1
C                           samples to N/2+1 samples
C
C_____
C
C       Local Variables
C
C           I, J        Sorting loop counters
C           MIDDLE      Address of middle value in the sorted input vector
C           TEMP        Temporary storage used by sorting loops
C
C_____
C
C       Variable Declarations
C
        IMPLICIT NONE
C
        INTEGER*2  I, J, MIDDLE, NSAMPLES
C
        REAL*4     TEMP, VECTOR (NSAMPLES)
C
C_____
C
C                       EXECUTABLE CODE
C
C_____
C
C       Sort the input vector from smallest to largest values.
C
        DO I = 1,NSAMPLES/2+1
          DO J = 2,NSAMPLES
            IF ( VECTOR(J) .LT. VECTOR(J-1) ) THEN
              TEMP = VECTOR(J-1)
              VECTOR(J-1) = VECTOR(J)
              VECTOR(J) = TEMP
            END IF
          END DO
        END DO
```

```
C
C     Compute the median.  If the number of input samples is even, the
C     median is the average of the two middle samples.  If the number of
C     samples is odd, the median is the middle sample.
C
      IF (MOD(NSAMPLES,2) .EQ. 0) THEN
        MIDDLE = NSAMPLES/2
        MEDIAN = (VECTOR(MIDDLE) + VECTOR(MIDDLE+1)) / 2.0
      ELSE
        MIDDLE = NSAMPLES/2 + 1
        MEDIAN = VECTOR(MIDDLE)
      END IF
C
      RETURN
      END
C_____
C
C
C                       Texas Instruments
C                       TI INTERNAL DATA
C                  Property of Texas Instruments ONLY
C
C
C_____
C
      SUBROUTINE MATADD ( M1, M2, SUM, ROWS, COLS )
C
C_____
C
C     NAME:      MATADD
C
C     FUNCTION:  Adds two matrices.
C
C     DESCRIPTION:
C         Sum = matrix #1 + matrix #2.
C
C     REFERENCES:
C
C
C_____
C
C     CALLING SEQUENCE:
C         CALL MATADD ( M1, M2, SUM, ROWS, COLS )
C
C     INPUTS:
C         M1, M2      - Input matrices
C         ROWS, COLS  - Matrix dimensions
C
C     OUTPUTS:
C         SUM - Output matrix sum
C
C     DEPENDENCIES:
C         None
C
C     TARGET PROCESSOR:
C         VAX 8000 series VMS 4.5, Fortran Compiler 4.5-219
C
C     HISTORY:
C         02/18/91        D. Van Rheeden  Initial Release
C
```

```
C_____
C
C     Local Variables
C
C          I, J     Matrix indexes
C
C_____
C
C     Variable Declarations
C
      IMPLICIT NONE
C
      INTEGER*2    COLS, I, J, ROWS
C
      REAL*4       M1(ROWS,COLS), M2(ROWS,COLS),
     &             SUM(ROWS,COLS)
C
C_____
C
C                    EXECUTABLE CODE
C
C_____
C
C     Add the two input matrices.
C
      DO I = 1, ROWS
        DO J = 1, COLS
          SUM(I,J) = M1(I,J) + M2(I,J)
        END DO
      END DO
C
      RETURN
      END
C
C
C_____
C
      SUBROUTINE MATSUB ( M1, M2, DIFF, ROWS, COLS )
C
C_____
C
C     NAME:      MATSUB
C
C     FUNCTION:  Subtracts two matrices.
C
C     DESCRIPTION:
C          Difference = matrix #1 - matrix #2.
C
C     REFERENCES:
C
C_____
C
C     CALLING SEQUENCE:
C          CALL MATSUB ( M1, M2, DIFF, ROWS, COLS )
C
C     INPUTS:
C          M1, M2   -   Input matrices
C          ROWS, COLS  -   Matrix dimensions
C
```

```
C     OUTPUTS:
C         DIFF - Output matrix difference
C
C     DEPENDENCIES:
C         None
C
C     SIDE EFFECTS:
C         None
C
C     TARGET PROCESSOR:
C         VAX 8000 series VMS 4.5, Fortran Compiler 4.5-219
C
C     HISTORY:
C         02/18/91      D. Van RheedenInitial Release
C
C_____
C
C     Local Variables
C
C         I, J    Matrix indexes
C
C_____
C
C     Variable Declarations
C
      IMPLICIT NONE
C
      INTEGER*2    COLS, I, J, ROWS
C
      REAL*4       M1(ROWS,COLS), M2(ROWS,COLS), DIFF(ROWS,COLS)
C
C_____
C
C                      EXECUTABLE CODE
C
C_____
C
C     Subtract the two input matrices.
C
      DO I = 1, ROWS
       DO J = 1, COLS
         DIFF(I,J) = M1(I,J) + M2(I,J)
       END DO
      END DO
C
      RETURN
      END
C
C
C_____
C
           SUBROUTINE MATMULT ( M1, M2, PROD, ROW1, COL1, ROW2, COL2 )
C .
C_____
C
C     NAME:    MATMULT
C
C     FUNCTION: Multiplies two matrices.
```

```
C
C      DESCRIPTION:
C           If inner matrix dimensions do not match Then
C               Write status message to the user.
C               Exit from the program.
C           End if inner matrix dimensions do not match.
C           Product = matrix #1 * matrix #2.
C
C      REFERENCES:
C
C_____
C
C      CALLING SEQUENCE:
C           CALL MATMULT ( M1, M2, PROD, ROW1, COL1, ROW2, COL2 )
C
C      INPUTS:
C           M1, M2       - Input matrices
C           ROW1, COL1   - Input matrix M1 dimensions
C           ROW2, COL2   - Input matrix M2 dimensions
C
C      OUTPUTS:
C           PROD - Output matrix product
C
C      DEPENDENCIES:
C           EXIT - System exit routine
C
C      SIDE EFFECTS:
C           None
C
C      TARGET PROCESSOR:
C           VAX 8000 series VMS 4.5, Fortran Compiler 4.5-219
C
C      HISTORY:
C           02/18/91     D. Van Rheeden    Initial Release
C
C_____
C
C      Local Variables
C
C           I, J, K      Matrix indexes
C           SUM          Product accumulator
C
C_____
C
C      Variable Declarations
C
       IMPLICIT NONE
C
       INTEGER*2  COL1, COL2, I, J, K, ROW1, ROW2
C
       REAL*4    M1(ROW1,COL1), M2(ROW2,COL2), PROD(ROW1,COL2),
     &           SUM
C
C_____
C                          EXECUTABLE CODE
C
C_____
```

```
C
C     If the inner matrix dimensions do not agree, write a status message
C     and exit the program.
C
      IF ( COL1 .NE. ROW2 ) THEN
         WRITE(6,*) ' Error in MATMULT'
     &              ' Inner matrix dimensions do not agree.'
         CALL EXIT (0)
      END IF
C
C     Multiply the two input matrices.
C
      DO I = 1, ROW1
        DO J = 1, COL2
          SUM = 0.0
          DO K = 1, COL1
            SUM = SUM + M1(I,K) * M2(K,J)
          END DO
          PROD(I,J) = SUM
        END DO
      END DO
C
      RETURN
      END
C
C
C_____
C
      SUBROUTINE MATCOPY ( M, COPY, ROWS, COLS )
C
C_____
C
C     NAME:     MATCOPY
C
C     FUNCTION: Copies a matrix.
C
C     DESCRIPTION:
C         Copy the input matrix to the output matrix.
C
C     REFERENCES:
C
C_____
C
C     CALLING SEQUENCE:
C         CALL MATCOPY ( M, COPY, ROWS, COLS )
C
C     INPUTS:
C         M    - Input matrix
C         ROWS, COLS - Matrix dimensions
C
C     OUTPUTS:
C         COPY - Copy of the input matrix
C
C     DEPENDENCIES:
C         None
C
C     SIDE EFFECTS:
C         None
```

```
C
C     TARGET PROCESSOR:
C          VAX 8000 series VMS 4.5, Fortran Compiler 4.5-219
C
C     HISTORY:
C          02/18/91   D. Van Rheeden    Initial Release
C
C_____
C
C     Local Variables
C
C          I, J     Matrix indexes
C
C_____
C
C     Variable Declarations
C
      IMPLICIT NONE
C
      INTEGER*2    COLS, I, J, ROWS
C
      REAL*4       M(ROWS,COLS), COPY(ROWS,COLS)
C
C_____
C
C                    EXECUTABLE CODE
C
C_____
C
C     Copy the input matrix into the output matrix.
C
      DO I = 1, ROWS
        DO J = 1, COLS
          COPY(I,J) = M(I,J)
        END DO
      END DO
C
C
      RETURN
      END
C
C
C_____
C
      SUBROUTINE MATTRAN ( M, TRANS, ROWS, COLS )
C
C_____
C
C     NAME:       MATTRAN
C
C     FUNCTION:   Transposes a matrix.
C
C     DESCRIPTION: Transpose the input matrix.
C
C     REFERENCES:
C
C_____
C
C     CALLING SEQUENCE:
```

```
C        CALL MATTRAN ( M, TRANS, ROWS, COLS )
C
C    INPUTS:
C        M          - Input matrix
C        ROWS, COLS - Matrix dimensions
C
C    OUTPUTS:
C        TRANS - Output matrix difference
C
C    DEPENDENCIES:
C        None
C
C    SIDE EFFECTS:
C        None
C
C    TARGET PROCESSOR:
C        VAX 8000 series VMS 4.5, Fortran Compiler 4.5-219
C
C    HISTORY:
C        02/18/91   D. Van Rheeden   Initial Release
C
C_____
C
C    Local Variables
C
C        I, J    Matrix indexes
C
C_____
C
C    Variable Declarations
C
         IMPLICIT NONE
C
         INTEGER*2  COLS, I, J, ROWS
C
         REAL*4     M(ROWS,COLS), TRANS(ROWS,COLS)
C
C_____
C
C                    EXECUTABLE CODE
C
C_____
C
C    Transpose the input matrix.
C
         DO I = 1, ROWS
           DO J = 1, COLS
             TRANS(J,I) = M(I,J)
           END DO
         END DO
C
         RETURN
         END
C
C
C_____
C
         SUBROUTINE MATDET ( M, DET, WORK, ROWS, COLS )
C
```

```
C
C
C      NAME:         MATDET
C
C      FUNCTION:     Computes the determinant of a square matrix.
C
C      DESCRIPTION:
C           If the input matrix is not square Then
C              Write status message to the user.
C              Exit from the program.
C           End if input matrix is not square.
C           Copy input matrix into temporary work array.
C           Decompose the matrix into lower/upper (LU) form.
C           Determinant = product of LU matrix diagonal elements.
C
C      REFERENCES:
C
C
C
C      CALLING SEQUENCE:
C           CALL MATDET ( M, DET, WORK, ROWS, COLS )
C
C      INPUTS:
C           M              - Input matrix
C           ROWS, COLS     - Matrix dimensions
C
C           WORK           - Temporary work array
C
C      OUTPUTS:
C           DET - Output matrix determinant
C
C      DEPENDENCIES:
C           EXIT           - System exit routine
C           MATLUD         - Lower/Upper (LU) matrix decomposition
C
C      SIDE EFFECTS:
C           A copy should be made of the input matrix unless the user
C           desires to use the LU decomposed matrix.
C
C      TARGET PROCESSOR:
C           VAX 8000 series VMS 4.5, Fortran Compiler 4.5-219
C
C      HISTORY:
C           02/18/91  D. Van Rheeden  Initial Release
C
C
C
C      Local Variables
C
C           I J      Matrix indexes
C           INDX     LU decomposition backsubstitution index vector
C
C
C
C      Variable Declarations
C
           IMPLICIT NONE
C
           INTEGER*2    COLS, I, INDX(50), J, ROWS
```

```
C         REAL*4     DET, M(ROWS,COLS), WORK(ROWS,COLS)
C
C_____
C
C                    EXECUTABLE CODE
C
C_____
C
C    If the input matrix is not square then write a status message and
C    exit the program.
C
          IF ( ROWS .NE. COLS ) THEN
            WRITE (6,*) ' Error in MATDET ... ',
     &      ' Cannot compute determinant of a 'nonsquare matrix. '
            CALL EXIT (0)
          END IF
C
C    Copy input matrix into temporary work array.
C
          CALL MATCOPY ( M, WORK, ROWS, COLS)
C
C    Decompose the input matrix into lower/upper (LU) form.
C
          CALL MATLUD ( WORK, ROWS, COLS, INDX, DET )
C
C    Compute determinant as the product of the diagonal elements of
C    the LU decomposed matrix. The return value DET from MATLUD
C    determines the sign of the determinant.
C
          DO J = 1, ROWS
            DET = DET + WORK(J,J)
          END DO
C
          RETURN
          END
C
C_____
C
          SUBROUTINE MATINV ( M, INV, WORK, ROWS, COLS)
C
C_____
C
C    NAME:      MATINV
C
C    FUNCTION:  Inverts a square matrix.
C
C    DESCRIPTION:
C          If the input matrix is not square Then
C              Write status message to the user.
C              Exit from the program.
C          End if input matrix into the work array.
C          Copy input matrix into the work array.
C          Decompose the matrix into lower/upper (LU) form.
C          Do backsubstitution of the LU decomposed matrix one row
C              at a time.
C
C    REFERENCES:
C
```

```
C_____
C
C     CALLING SEQUENCE:
C          CALL MATINV ( M, INV, WORK, ROWS, COLS )
C
C     INPUTS:
C
C          M              - Input matrix
C          ROWS, COLS     - Matrix dimensions
C          WORK           - Temporary work space matrix
C
C     OUTPUTS:
C
C          M              - LU decomposition of the input matrix
C          INV            - Output inverse matrix
C
C     DEPENDENCIES:
C          EXIT           - System exit routine
C          MATLUB         - Lower/Upper (LU) matrix backsubstitution
C          MATLUD         - Lower/Upper (LU) matrix decomposition
C
C     SIDE EFFECTS:
C          None
C
C     TARGET PROCESSOR:
C          VAX 8000 series VMS 4.5, Fortran Compiler 4.5-219
C
C     HISTORY:
C
C          02/18/91   D. Van Rheeden   Initial Release
C
C_____
C
C_____
C
C     Local Variables
C
C          I, J           Matrix indexes
C          INDX           LU decomposition backsubstitution index vector
C          SIGN           LU decomposition return sign
C          V              LU backsubstitution solution vector
C
C_____
C
C     Variable Declarations
C
      IMPLICIT NONE
C
      INTEGER*2   COLS, I, INDX(50), J, ROWS
C
      REAL*4      INV(ROWS,COLS), M(ROWS,COLS), SIGN, V(50),
     &            WORK(ROWS,COLS)
C
C_____
C
C                   EXECUTABLE CODE
C
C_____
C
```

```
C      If the input matrix is not square then write a status message and
C      exit the program.
C
       IF ( ROWS .NE. COLS ) THEN
          WRITE(6,*) ' Error in MATINV...',
    '     Cannot invert a nonsquare matrix. '
          CALL EXIT (0)
       END IF
C
C      Copy input matrix into the work array.
C
       CALL MATCOPY ( M, WORK, ROWS, COLS, )
C
C      Decompose the input matrix into lower/upper (LU) form.
C
       CALL MATLUD ( WORK, ROWS, COLS, INDX, SIGN )
C
C      Perform backsubstitution of the LU decomposed matrix one row
C      at a time.
C
       DO J = 1, COLS
          DO I = 1, ROWS
             V(I) = 0
          END DO
          V(J) = 1.0
          CALL MATLUB ( WORK, ROWS, COLS, INDX, V )
          DO I = 1, ROWS
             INV(I,J) = V(I)
          END DO
       END DO
C
       RETURN
       END
C
C_____
C
              SUBROUTINE MATLUD ( M, ROWS, COLS, INDX, SIGN)
C
C_____
C
C      NAME:    MATLUD
C
C      FUNCTION:   Matrix Lower/Upper (LU) decomposition.
C
C      DESCRIPTION:
C           If the input matrix is not square Then
C              Write status message to the user.
C              Exit from the program.
C           End if input matrix is not square.
C           Decompose the matrix into lower/upper (LU) form.
C
C      REFERENCES:
C
C
C_____
C
C      CALLING SEQUENCE:
C           CALL MATLUD ( M, ROWS, COLS, INDX, SIGN )
C
C      INPUTS:
```

```
C          M         - Input matrix
C          ROWS, COLS   - Matrix dimensions
C
C     OUTPUTS:
C
C          M         - LU decomposition of the input matrix
C          INDX      - Backsubstitution index vector
C          SIGN      - LU decomposition return sign (+-1)
C
C     DEPENDENCIES:
C          EXIT      - System exit routine
C
C     SIDE EFFECTS:
C          None
C
C     TARGET PROCESSOR:
C          VAX 8000 series VMS 4.5, Fortran Compiler 4.5-219
C
C     HISTORY:
C
C          02/18/91   D. Van Rheeden    Initial Release
C
C_____
C
C     Local Variables
C
C          BIG       Input matrix element with largest magnitude
C          DUM       Dummy argument used for temporary storage
C          I, J, K   Matrix loop indexes
C          IMAX      Decomposition index values saved in INDX vector
C          SUM       Intermediate sum
C          TINY      Small number used to prevent divides by zero
C          VV        Pivot vector
C
C_____
C
C     Variable Declarations
C
      IMPLICIT NONE
C
      INTEGER*2  COLS, I, IMAX, INDX(50), J, K, ROWS
C
      REAL*4    BIG, DUM, M(ROWS,COLS), SIGN, SUM, TINY/1.0e-20/, VV(50)
C
C_____
C
C              EXECUTABLE CODE
C
C_____
C
C     If the input matrix is not square then write a status message and
C     exit the program.
C
      IF ( ROWS .NE. COLS ) THEN
          WRITE(6,*) ' Error in MATLUD...',
     &               ' Cannot decompose a nonsquare matrix. '
          CALL EXIT (0)
      END IF
```

```
C
C     Decompose the input matrix into lower/upper (LU) form.
C
         SIGN = 1.0
C
         DO I = 1, ROWS
           BIG = 0.0
           DO J = 1, COLS
             IF ( ABS( M(I,J) ) .GT. BIG) BIG = ABS( M(I,J) )
           END DO
           IF (BIG .EQ. 0.0) THEN
             WRITE(6,*) ' Error in MATLUD...',
     &                  ' Matrix is singular.'
             CALL EXIT (0)
           END IF
           VV(I) = 1.0 / BIG
         END DO
C
         DO J = 1, ROWS
           IF (J .GT. 1) THEN
             DO I = 1, J-1
               SUM - M(I,J)
               IF (I .GT. 1) THEN
                 DO K = 1, I-1
                   SUM = SUM - M(I,K) + M(K,J)
                 END DO
                 M(I,J) = SUM
               END IF
             END DO
           END IF
C
           BIG = 0.0
C
           DO I = J, ROWS
C
             SUM = M(I,J)
C
             IF (J .GT. 1) THEN
               DO K = 1, J-1
                 SUM = SUM - M(I,K) + M(K+J)
               END DO
               M(I,J) = SUM
             END IF
C
             DUM = VV(I) * ABS(SUM)
C
             IF (DUM .GT. BIG) THEN
               BIG = DUM
               IMAX = I
             END IF
           END DO
C
           IF (J .NE. IMAX) THEN
             DO K = 1, ROWS
               DUM = M(IMAX,K)
               M(IMAX,K) = M(J,K)
               M(J,K) = DUM
             END DO
```

```
          SIGN = -SIGN
          VV(IMAX) = VV(J)
       END IF
C
       INDX(J) = IMAX
C
       IF ( J .LT. COLS ) THEN
          IF ( M(J,J) .EQ. 0.0 ) M(J,J) = TINY
          DUM - 1.0 / M(J,J)
          DO I = J+1, ROWS
             M(I,J) = M(I,J) * DUM
          END DO
       END IF
C
       END DO
C
       IF   ( M(ROWS,COLS) .EQ. 0.0 ) M(ROWS,COLS) = TINY
C
       RETURN
       END
C
C_____
C
       SUBROUTINE MATLUB ( M, ROWS, COLS, INDX, BCK )
C
C_____
C
C
C      NAME:   MATLUB
C
C      FUNCTION:   Lower/Upper (LU) decomposed matrix backsubstitution
C
C      DESCRIPTION:
C           If the input matrix is not square Then
C              Write status message to the user.
C              Exit from the program.
C           End if input matrix is not square.
C           Perform the backsubstitution.
C
C      REFERENCES:
C
C
C
C_____
C
C      CALLING SEQUENCE:
C           CALL MATLUB ( M, ROWS, COLS, INDX, BCK )
C
C      INPUTS:
C
C           M             - Input matrix
C           ROWS, COLS    - Matrix dimensions
C
C      OUTPUTS:
C
C           M       - LU decomposition of the input matrix
C           INDX    - Backsubstitution index vector
C           BCK     - Backsubstitution vector for current row
C
```

```
C     DEPENDENCIES:
C         EXIT          - System exit routine
C
C     SIDE EFFECTS:
C         The input matrix must be an LU decomposed matrix.
C
C     TARGET PROCESSOR:
C         VAX 8000 series VMS 4.5, Fortran Compiler 4.5-219
C
C     HISTORY:
C         02/18/91   D. Van Rheeden    Initial Release
C
C_____
C
C     Local Variables
C
C         I, J    Matrix/vector indexes
C         II      Nonzero backsubstitution sum index
C         IP      Pointer into the INDX vector
C         SUM     Intermediate sum
C
C_____
C
C     Variable Declarations
C
      IMPLICIT NONE
C
      INTEGER*2  COLS, I, II, IP, INDX(50), J, ROWS
C
      REAL*4     BCK(50), M(ROWS,COLS), SUM
C
C_____
C
C                   EXECUTABLE CODE
C
C_____
C
C     If the input matrix is not square then write a status message and
C     exit the program.

IF ( ROWS .NE. COLS ) THEN
         WRITE (6,*) ' Error in MATLUB... ',
     &   ' Cannot do backsubstitution on a nonsquare matrix. '
         CALL EXIT (0)
      END IF
C
C     Perform the backsubstitution.
C
      II = 0
C
      DO I = 1, ROWS
         IP = INDX(I)
         SUM = BCK(IP)
         BCK(IP) = BCK(I)
         IF ( II .NE. 0 ) THEN
            DO J = II, I-1
               SUM = SUM - M(I,J) * BCK(J)
            END DO
```

```
          ELSE IF ( SUM .NE. 0.0 ) THEN
             II = I
          END IF
          BCK(I) = SUM
        END DO
C
        DO I = ROWS, 1, -1
          SUM = BCK(I)
          IF ( I .LT. ROWS ) THEN
            DO J = I+1, COLS
              SUM = SUM - M(I,J) * BCK(J)
            END DO
          END IF
          BCK(I) = SUM / M(I,I)
        END DO
C
        RETURN
        END
```

```
C_____
C
C                         Texas Instruments
C                         TI INTERNAL DATA
C                    Property of Texas Instruments ONLY
C_____
C
        SUBROUTINE VECADD ( V1, V2, SUM, COLS )
C
C_____
C
C     NAME:   VECADD
C
C     FUNCTION:     Adds two vectors.
C
C     DESCRIPTION:
C         Sum = vector #1 + vector #2.
C
C     REFERENCES:
C
C_____
C
C     CALLING SEQUENCE:
C         CALL VECADD ( V1, V2, SUM, COLS )
C
C     INPUTS:
C         V1, V2  - Input vectors
C         COLS    - Vector dimensions
C
C     OUTPUTS
C         SUM     - Output vector sum
C
C     DEPENDENCIES:
C         None
C
C     SIDE EFFECTS:
C         None
C
C     TARGET PROCESSOR:
C         VAX 8000 series VMS 4.5, Fortran Compiler 4.5-219
```

```
C
C     HISTORY:
C
C         02/18/91   D. Van Rheeden   Initial Release
C
C
C_____
C
C     Local Variables
C
C         I    -       Vector index
C
C
C_____
C
C     Variable Declarations
C
      IMPLICIT NONE
C
      INTEGER*2      COLS, I
C
      REAL*4         V1(COLS), V2(COLS), SUM(COLS)
C_____
C
C                      EXECUTABLE CODE
C
C_____
C
C     Add the two input vectors.
C
          DO I = 1, COLS
            SUM(I) = V1(I) + V2(I)
          END DO
C
          RETURN
          END
C
C_____
C
          SUBROUTINE VECSUB ( V1, V2, DIFF, COLS )
C
C_____
C
C     NAME:      VECSUB
C
C     FUNCTION:   Subtracts two vectors.
C
C     DESCRIPTION:
C         Difference = vector #1 - vector #2.
C
C     REFERENCES:
C
C
C_____
C
C     CALLING SEQUENCE:
C         CALL VECSUB ( V1, V2, DIFF, COLS)
C
C     INPUTS:
C         V1, V2  - Input vectors
C         COLS    - Vector dimensions
C
```

```
C     OUTPUTS:
C         DIFF   - Output vector difference
C
C     DEPENDENCIES:
C         None
C
C     SIDE EFFECTS:
C         None
C
C     TARGET PROCESSOR:
C         VAX 8000 series VMS 4.5, Fortran Compiler 4.5-219C
C
C     HISTORY:
C         02/18/91   D. Van Rheeden   Initial Release
C
C     Local Variables
C
C                   Vector index
C
C_____
C
C     Variable Declarations
C
      IMPLICIT NONE
C
      INTEGER*2      COLS, I
C
      REAL*4         V1(COLS), V2(COLS), DIFF(COLS)

C_____
C
C                   EXECUTABLE CODE
C
C_____
C
C     Subtract the two input vectors.
C
      DO I = 1, COLS
        DIFF(I) = V1(I) - V2(I)
      END DO
C
      RETURN
      END
C
C_____
C
      SUBROUTINE VECMULT ( V1, V2, PROD, COL1, COL2 )
C
C_____

C     NAME:   VECMULT
C
C     FUNCTION:      Multiplies two vectors to give the inner product.

C     DESCRIPTION:
C         If inner vector dimensions do not match Then
C           Write status message to the user.
C           Exit from the program.
C         End if inner vector dimensions do not match.
```

```
C           Inner product = vector #1 (transposed) * vector #2.
C
C    REFERENCES:
C
C_____
C
C    CALLING SEQUENCE:
C         CALL VECMULT ( V1, V2, PROD, COL1, COL2)
C
C    INPUTS:
C         V1, V2   - Input vectors
C         COL1     - Input vector V1 dimensions
C         COL2     - Input vector V2 dimensions
C
C    OUTPUTS:
C         PROD     - Output vector inner product
C
C    DEPENDENCIES:
C         EXIT     - System exit routine
C
C    SIDE EFFECTS:
C         None
C
C    TARGET PROCESSOR:
C         VAX 8000 series VMS 4.5, Fortran Compiler 4.5-219
C
C    HISTORY:
C         02/18/91  D. Van Rheeden   Initial Release
C
C_____
C
C    Local Variables
C
C         I          Vector index
C
C_____
C
C    Variable Declarations
C
      IMPLICIT NONE
C
      INTEGER*2    COL1, COL2, I
C
      REAL*4       V1(COL1), V2(COL2), PROD
C
C_____
C
C                    EXECUTABLE CODE
C
C_____
C
C If the vector dimensions do not agree, write a status message
C and exit the program.
C
      IF ( COL1 .NE. COL2 ) THEN
         WRITE (6,*) ' Error in VECMULT... ',
     &               ' Vector dimensions do not agree. '
         CALL EXIT (0)
      END IF
```

```
C
C      Multiply the two input vectors.
C
       PROD = 0.0
       DO I = 1, COL1
         PROD = PROD + V1(I) * V2(I)
       END DO
C
       RETURN
       END
C
C
C_____
C
       SUBROUTINE MVMULT ( M, V, PROD, ROW1, COL1, COL2 )
C
C_____

C   NAME:    MVMULT
C
C   FUNCTION:     Multiplies a matrix by a vector.
C
C   DESCRIPTION:
C       If matrix column dimension does not match vector
C       dimension Then
C       Write status message to the user.
C       Exit from the program.
C       End if dimensions do not match.
C       Product = matrix * vector.
C
C   REFERENCES:
C
C_____
C
C   CALLING SEQUENCE:
C       CALL MVMULT ( M, V, PROD, ROW1, COL1, COL2 )
C   INPUTS:
C       M           - Input matrix
C       V           - Input vector
C       ROW1, COL1  - Input matrix M dimensions
C       COL2        - Input vector V dimensions
C
C   OUTPUTS:
C       PROD    - Output vector = M * V
C
C   DEPENDENCIES:
C       EXIT    - System exit routine
C
C   SIDE EFFECTS:
C       None
C
C   TARGET PROCESSOR:
C       VAX 8000 series VMS 4.5, Fortran Compiler 4.5-219
C
C   HISTORY:
C       02/18/91   D. Van Rheeden   Initial Release
C
```

```
C
C
C      Local Variables
C
C         I, J         Matrix/vector index
C         SUM          Product accumulator
C
C
C
C      Variable Declarations
C
       IMPLICIT NONE
C
       INTEGER*2    COL1, COL2, I, J, ROW1
C
       REAL*4       M(ROW1,COL1), V(COL2), PROD(ROW1), SUM
C
C
C
C                        EXECUTABLE CODE
C
C
C
C      If the matrix column dimension do not match the vector
C      dimension, write a status message and exit the program.
C
C
C
       IF ( COL1 .NE. COL2 ) THEN
          WRITE (6,*) ' Error in MVMULT... ',
     &       ' Matrix column and vector dimensions do not agree. '
          CALL EXIT (0)
       END IF
C
C      Multiply the input matrix by the input vector.
C
       DO I = 1, ROW1
          SUM = 0.0
          DO J = 1, COL1
             SUM = SUM + M(I,J) * V(J)
          END DO
          PROD(I) = SUM
       END DO
C
       RETURN
       END
C
C
C
C
       SUBROUTINE VMMULT ( V, M, PROD, ROW1, ROW2, COL2 )
C
C
C
C      NAME:    VMMULT
C
C      FUNCTION:    Multiplies a vector by a matrix.
C
```

```
C   DESCRIPTION:
C       If vector dimension does not match matrix row dimension C Then
C           Write status message to the user.
C           Exit from the program.
C       End if dimensions do not match.
C       Product = vector * matrix.
C
C   REFERENCES:
C
C
C_____
C
C   CALLING SEQUENCE:
C       CALL VMMULT ( V, M, PROD, ROW1, ROW2, COL2 )
C
C   INPUTS:
C       V           -   Input vector
C       M           -   Input matrix
C       ROW1        -   Input vector V dimension
C       ROW 2, COL2 -   Input matrix M dimensions
C
C   OUTPUTS:
C       PROD    - Output vector = V^T * M
C
C   DEPENDENCIES:
C       EXIT    - System exit routine
C
C   SIDE EFFECTS:
C       None
C
C   TARGET PROCESSOR:
C       VAX 8000 series VMS 4.5, Fortran Compiler 4.5-219
C
C   HISTORY:
C       02/18/91   D. Van Rheeden   Initial Release
C
C_____
C
C   Local Variables
C
C       I, J        Matrix/vector indexes
C       SUM         Product accumulator
C
C_____
C
C   Variable Declarations
C
        IMPLICIT NONE
C
        INTEGER*2   COL2, I, J, ROW1, ROW2
C
        REAL*4      V(ROW1), M(ROW2,COL2), PROD(COL2), SUM C_____
C
C                       EXECUTABLE CODE
C
C_____
C
C   If the vector dimension does not match the matrix row C dimension, then write a status
C   message and exit the program.
C
C
C
```

```
      IF ( ROW1 .NE. ROW2 ) THEN
         WRITE (6,*) ' Error in VMMULT... '
     &   'Vector dimension does not agree with matrix" row dimension.'
         CALL EXIT (0)
      END IF
C
C     Multiply the input vector by the input matrix.
C
      DO J = 1, COL2
        SUM = 0.0
        DO I = 1, ROW1
          SUM = SUM + V(I) * M(I,J)
        END DO
C
        PROD(J) = SUM
      END DO
C
      RETURN
      END
```

Although the present invention and its advantages have been described in detail, it should be understood that various changes, substitutions and alterations can be made herein without departing from the spirit and scope of the invention as defined by the appended claims.

What is claimed is:

1. A method for tracking an aimpoint comprises the steps of
   acquiring an aimpoint on a target and a set of subimages arbitrarily associated with the aimpoint by a sensor in a field of view;
   for a first time, calculating a normalized distance from each subimage to the aimpoint;
   for a second time, reacquiring at least one of the subimages; and
   estimating a subsequent location of the aimpoint based on the subsequent location of the subimages and on the normalized distances.

2. The method of claim 1 wherein said estimating step further comprises the steps of calculating the subsequent location of the aimpoint using a least squares technique on a vector of subimage locations.

3. The method of claim 1 wherein said step of reacquiring further comprises the step of computing a target image magnification factor to determine the amount of movement of said at least one subimage within the field of view from the first time to the second time.

4. The method of claim 3 wherein said estimating step further comprises the step of computing a single target image magnification factor.

5. The method of claim 3 wherein said estimating step further comprises the step of computing a dual target image magnification factor.

6. The method of claim 5 wherein the dual target image magnification factor contains a first element corresponding to a horizontal magnification factor and a second element corresponding to a vertical magnification factor of the target in the field of view.

7. The method of claim 5 wherein the dual target image magnification factor contains at least one element indicating the angular rotation of the target about an axis generally perpendicular to the focal plane of the sensor.

8. A method for tracking an aimpoint comprising the steps of:
   selecting an aimpoint;
   for a first time, acquiring a set of subimages arbitrarily associated with the aimpoint;
   calculating the normalized distance from each subimage to the aimpoint;
   for a later time reacquiring at least one of the subimages; and
   estimating subsequent locations of the aimpoint based on a least squares technique of the locations indicated by each subsequent subimage, the normalized distance of the subimage and at least one magnification factor.

9. The method of claim 8 wherein said estimating step further comprises the step of estimating subsequent locations of the aimpoint using a second magnification factor.

10. A method for tracking an aimpoint on a target comprising the steps of:
    selecting an aimpoint on the target;
    for a first time, acquiring a set of subimages of the target arbitrarily associated with the aimpoint using predetermined subimage trackability criteria using an image sensor operable to change its displacement relative to the target;
    calculating the geometric relationship of each subimage to the aimpoint;
    between a first time and a second time, changing the displacement of the image sensor relative to the target;
    reacquiring at least one of the subimages at a second time using the sensor; and
    calculating a location of the aimpoint at said second time using the geometric relationship between the at least one subimage and said aimpoint.

11. The method of claim 10 wherein said calculating step further comprises the step of calculating two magnification factors.

12. The method of claim 11 wherein the two magnification factors comprises at least one factor indicating the angular rotation of the target about an axis generally perpendicular to the focal plane of the sensor.

13. The method of claim 10 wherein said calculating step further comprises the step of calculating a single magnification factor.

14. The method of claim 10 wherein said reacquiring step further comprises the step of reacquiring a set of subimages with a sensor mounted on a missile.

15. The method of claim 10 wherein said selecting step further comprises the step of selecting a subimage using the criteria of subimage hotspots.

16. The method of claim 10 wherein said selecting step further comprises the step of selecting a subimage using the criteria of subimage contrast.

17. The method of claim 10 wherein said second calculating step further comprises the step of estimating the second aimpoint based on a least squares technique of each location indicated by each reacquired subimage.

18. A guidance system for tracking an aimpoint, the guidance system comprising:
- a sensor for initially acquiring an aimpoint and for periodically acquiring a set of subimages arbitrarily associated with the aimpoint;
- a processor for calculating the normalized distance from the first set of subimages to the aimpoint, and for estimating subsequent locations of the aimpoint based on the periodically acquired subimages and the normalized distances; and
- memory for storing the normalized distances.

19. The guidance system of claim 18, further comprising a means for moving the sensor towards each of the subsequent locations of the aimpoint.

20. A missile comprising:
- a sensor for initially acquiring an aimpoint and for periodically acquiring a set of subimages arbitrarily associated with the aimpoint;
- a processor for calculating the normalized distance from the first set of subimages to the aimpoint, and for estimating subsequent locations of the aimpoint based on the periodically acquired subimages and the normalized distances;
- memory for storing the normalized distances;
- fins for guiding the missile responsive to the estimated aimpoints; and
- a motor for propelling the missile.

* * * * *